US011186399B2

(12) United States Patent
Dugat

(10) Patent No.: US 11,186,399 B2
(45) Date of Patent: Nov. 30, 2021

(54) AUTOMATED CONTAINER CUTTING APPARATUS

(71) Applicant: Robotica, Inc., Spring, TX (US)

(72) Inventor: Jay Mark Dugat, Spring, TX (US)

( * ) Notice: Subject to any disclaimer, the term of this patent is extended or adjusted under 35 U.S.C. 154(b) by 446 days.

(21) Appl. No.: 14/775,551

(22) PCT Filed: Mar. 12, 2014

(86) PCT No.: PCT/US2014/025098
§ 371 (c)(1),
(2) Date: Sep. 11, 2015

(87) PCT Pub. No.: WO2014/165288
PCT Pub. Date: Oct. 9, 2014

(65) Prior Publication Data
US 2016/0031580 A1 Feb. 4, 2016

Related U.S. Application Data

(60) Provisional application No. 61/778,202, filed on Mar. 12, 2013.

(51) Int. Cl.
*B26D 3/12* (2006.01)
*B26D 5/08* (2006.01)
(Continued)

(52) U.S. Cl.
CPC .......... *B65B 69/0033* (2013.01); *B23K 26/03* (2013.01); *B23K 26/082* (2015.10);
(Continued)

(58) Field of Classification Search
CPC .......... B23D 3/12; B23D 5/08; B23D 7/0625; B65B 69/0025; B65B 69/0033;
(Continued)

(56) References Cited

U.S. PATENT DOCUMENTS 1,603,633 A 10/1926 Nelson
1,737,762 A 12/1929 Howe
(Continued)

FOREIGN PATENT DOCUMENTS

DE 2259273 C2 6/1974

OTHER PUBLICATIONS

PCT/US2014/025098 International Search Report and Written Opinion dated Sep. 15, 2014, 11 pages.
(Continued)

*Primary Examiner* — Clark F Dexter
(74) *Attorney, Agent, or Firm* — JL Salazar

(57) ABSTRACT

An automated container cutting apparatus configured to cut various sized rectilinear containers without unnecessary costs or lack of transportability. The automated container cutting apparatus includes a right angle transfer conveyor that positions a container in a first cutting position. The apparatus also includes a cutting mechanism configured to cut the container on two adjacent edges while in the first cutting position. The cutting mechanism further includes two cutting elements supported at right angles to one another for horizontally cutting a container on two adjacent edges.

12 Claims, 18 Drawing Sheets

(51) Int. Cl.
| | |
|---|---|
| *B26D 7/06* | (2006.01) |
| *B65B 69/00* | (2006.01) |
| *B23K 26/08* | (2014.01) |
| *B23K 26/12* | (2014.01) |
| *B23K 26/38* | (2014.01) |
| *B23K 26/082* | (2014.01) |
| *B23K 26/03* | (2006.01) |
| *B23K 26/402* | (2014.01) |
| *B65B 57/02* | (2006.01) |
| *B23K 101/04* | (2006.01) |
| *B23K 103/00* | (2006.01) |
| *B65B 59/02* | (2006.01) |
| *B65B 59/00* | (2006.01) |

(52) U.S. Cl.
CPC ........ *B23K 26/0838* (2013.01); *B23K 26/127* (2013.01); *B23K 26/38* (2013.01); *B23K 26/402* (2013.01); *B26D 3/12* (2013.01); *B26D 5/08* (2013.01); *B26D 7/0625* (2013.01); *B65B 57/02* (2013.01); *B23K 2101/04* (2018.08); *B23K 2103/40* (2018.08); *B23K 2103/50* (2018.08); *B65B 59/003* (2019.05); *B65B 59/02* (2013.01); *Y10S 83/946* (2013.01); *Y10T 83/6476* (2015.04); *Y10T 83/8822* (2015.04)

(58) Field of Classification Search
CPC ............... Y10S 83/946; Y10T 83/0222; Y10T 83/0363; Y10T 83/037; Y10T 83/0605; Y10T 83/647; Y10T 83/6476; Y10T 83/7593; Y10T 83/7627; Y10T 83/8822
USPC .............. 53/381.1, 381.2, 492; 83/56, 467.1, 83/468.4, 614, 864, 883, 884, 946, 401, 83/404; 414/411, 412
See application file for complete search history.

(56) References Cited

U.S. PATENT DOCUMENTS

| | | | | |
|---|---|---|---|---|
| 2,993,583 | A | * | 7/1961 | Sykes ..................... B65G 47/54 198/370.07 |
| 3,135,049 | A | * | 6/1964 | Daugherty et al. ......................... B65B 69/0033 30/2 |
| 3,137,068 | A | * | 6/1964 | Quigley .............. B65B 69/0033 30/2 |
| 3,232,409 | A | | 2/1966 | Pierson et al. |
| 3,606,058 | A | * | 9/1971 | Davis .................. B65B 69/0033 30/2 |
| 3,922,778 | A | * | 12/1975 | Aalpoel .............. B65B 69/0033 30/2 |
| 3,944,054 | A | | 3/1976 | Ensinger |
| 4,014,428 | A | | 3/1977 | Ossbahr |
| 4,187,755 | A | * | 2/1980 | Shirai ................... C03B 33/027 83/487 |
| 4,192,496 | A | | 3/1980 | Baselice et al. |
| 4,200,178 | A | | 4/1980 | Gunti |
| 4,256,213 | A | | 3/1981 | Shaw et al. |
| 4,269,302 | A | | 5/1981 | Garvey |
| 4,653,961 | A | | 3/1987 | Hashimoto |
| 4,715,488 | A | | 12/1987 | Hewitt et al. |
| 4,730,718 | A | | 3/1988 | Fazio et al. |
| 4,804,081 | A | | 2/1989 | Lenhardt |
| 4,962,841 | A | | 10/1990 | Kloosterhouse |
| 5,033,348 | A | * | 7/1991 | Walsh ...................... B67B 7/38 30/2 |
| 5,101,703 | A | | 4/1992 | Tanaka et al. |
| 5,165,516 | A | | 11/1992 | Reed et al. |
| 5,172,804 | A | | 12/1992 | Chersin |
| 5,217,110 | A | | 6/1993 | Spangler et al. |
| 5,351,809 | A | | 10/1994 | Gilmore et al. |
| 5,568,857 | A | | 10/1996 | Chen et al. |
| 5,699,892 | A | | 12/1997 | Shyr et al. |
| 5,718,325 | A | | 2/1998 | Doster et al. |
| 5,725,349 | A | * | 3/1998 | Garvey et al. ...... B65B 69/0033 414/412 |
| 5,758,362 | A | * | 6/1998 | Focke et al. ........ B65B 69/0025 414/412 |
| 5,854,460 | A | | 12/1998 | Graf et al. |
| 5,911,300 | A | | 6/1999 | Mraz |
| 5,971,132 | A | | 10/1999 | Bonnet |
| 5,984,078 | A | | 11/1999 | Bonnet |
| 6,068,111 | A | | 5/2000 | Smith et al. |
| 6,073,747 | A | | 6/2000 | Takino et al. |
| 6,227,377 | B1 | | 5/2001 | Bonnet |
| 6,471,031 | B1 | | 10/2002 | Duncalf |
| 6,533,096 | B2 | | 3/2003 | Gilmore et al. |
| 6,629,018 | B2 | | 9/2003 | Mondie et al. |
| 6,719,119 | B1 | | 4/2004 | Hendzel et al. |
| 6,782,993 | B2 | | 8/2004 | Bernard et al. |
| 6,843,365 | B2 | | 1/2005 | Baker |
| 6,907,978 | B2 | | 6/2005 | Evans et al. |
| 6,957,736 | B2 | | 10/2005 | Bonifer et al. |
| 7,150,383 | B2 | | 12/2006 | Talken |
| 7,174,695 | B2 | * | 2/2007 | Porter et al. ........ B65B 69/0025 53/381.2 |
| 7,261,198 | B2 | | 8/2007 | Tatar et al. |
| 7,638,729 | B2 | | 12/2009 | Park |
| 7,641,043 | B2 | | 1/2010 | Vestergaard |
| 7,720,567 | B2 | | 5/2010 | Doke et al. |
| 7,909,153 | B2 | | 3/2011 | Pogue |
| 7,963,086 | B2 | * | 6/2011 | Porter et al. ........ B65B 69/0025 53/381.1 |
| 8,161,854 | B2 | | 4/2012 | Fourney |
| 8,561,790 | B2 | | 10/2013 | Brayman et al. |
| 8,684,169 | B2 | | 4/2014 | Itoh et al. |
| 8,827,623 | B2 | | 9/2014 | Stelter et al. |
| 9,110,773 | B2 | | 8/2015 | Roush |
| 9,216,862 | B2 | | 12/2015 | Wallace |
| 9,475,653 | B2 | | 10/2016 | Dugat |
| 9,926,094 | B2 | | 3/2018 | Dugat |
| 9,981,810 | B2 | | 5/2018 | Dugat |
| 9,988,218 | B2 | | 6/2018 | Dugat et al. |
| 10,232,409 | B2 | | 3/2019 | Dugat |
| 2001/0003939 | A1 | | 6/2001 | Lui et al. |
| 2004/0211651 | A1 | | 10/2004 | Hall |
| 2004/0226803 | A1 | | 11/2004 | Brixius et al. |
| 2007/0125212 | A1 | | 6/2007 | Hilgendorf |
| 2007/0221471 | A1 | | 9/2007 | Fourney et al. |
| 2008/0169171 | A1 | | 7/2008 | Itoh et al. |
| 2009/0065327 | A1 | | 3/2009 | Evangelista et al. |
| 2009/0113853 | A1 | | 5/2009 | Porter et al. |
| 2010/0272961 | A1 | | 10/2010 | Costin, Jr. |
| 2014/0290827 | A1 | | 10/2014 | Heeman |
| 2014/0346008 | A1 | | 11/2014 | Hoynash |
| 2015/0144536 | A1 | | 5/2015 | Dugat |
| 2016/0016684 | A1 | | 1/2016 | Dugat |
| 2016/0031580 | A1 | | 2/2016 | Dugat |
| 2017/0008706 | A1 | | 1/2017 | Dugat |
| 2017/0057756 | A1 | | 3/2017 | Dugat et al. |

OTHER PUBLICATIONS

PCT/US2014/025098 International Preliminary Report on Patentability dated Sep. 24, 2015, 9 pages.
PCT/US2014/025076 International Search Report and Written Opinion dated Jul. 8, 2014, 12 pages.
PCT/US2014/025076 International Preliminary Report On Patentability dated Sep. 24, 2015, 11 pages.
CN102079407A published Jun. 1, 2011, Abstract and machine translation from ISA/US for PCT/US2014/025076 International Search Report, 4 pages.
News Track Converyor Units Brochure, Mar. 2013, 2 pages.

* cited by examiner

AUTOMATED CONTAINER CUTTING APPARATUS

CLAIM FOR PRIORITY

This application is a 371 (national phase) application of PCT Application No. PCT/US2014/025098 filed on Mar. 12, 2014, which claims the benefit of U.S. Provisional Patent Application No. 61/778,202, filed on 12 Mar. 2013, the entire contents of which are hereby incorporated by reference.

FIELD

The subject matter of the present disclosure relates to an apparatus and methods for automated container cutting.

BACKGROUND

The present disclosure is concerned with industries and operations for handling containers including boxes and cartons, for example, for gaining access to the content of the containers. Various operations handle significant volumes of containers, such as co-pack operations, retailers, distributors, and reverse logistics, for example, which also need to cut and/or open these containers at some stage in the operation. These containers are generally sealed closed and often rectilinear in a variety of sizes.

In many low volume operations, these containers are manually cut and opened via sharp cutting tools that can be hazardous and time consuming. Although automated devices may be available to out such containers, such systems carry considerable cost and are generally purposed for high container volume processing for incorporation into existing handling systems at a central location. In addition, many high volume systems require high levels of sophistication to control, calibrate and repair.

Hence, it is desirable to devise an automated container cutting apparatus and method that addresses the need for versatile placement and lower costs, yet provides a safe environment to prevent user hazards in gaining access to the contents of the container. It is also desirable to provide an automated container cutting apparatus and method that allows for consistent and accurate cutting of varying sized containers without costly measurement sensors, processors and related complex controls (e.g. sophisticated closed loop controls, costly measurement sensors, position tracking, etc.) for automatic box opening of unknown sizes. It is further desirable to provide automated container cutting apparatus and method that allows for container cutting with a reduced footprint that is maneuverable and able to be repositioned where most beneficial to the current needs of the lower volume and/or more custom operations.

SUMMARY

Therefore, it is an object of the present invention to provide an automated container cutting apparatus and method that overcomes some or all of the known drawbacks and deficiencies of the prior art.

In one embodiment, the present disclosure relates to an automated container cutting apparatus configured to cut various sized rectilinear containers without unnecessary costs or lack of transportability. The automated container cutting apparatus includes a right angle transfer conveyor that positions a container in a first cutting position. The apparatus also includes a cutting mechanism configured to cut the container on two adjacent edges while in the first cutting position. The cutting mechanism further includes two cutting elements supported at right angles to one another for horizontally cutting a container on two adjacent edges.

In one embodiment, the present disclosure relates to an automated container cutting apparatus comprising a frame supporting a cutting mechanism and at least one right angle transfer conveyor. The cutting mechanism may comprise at least one linear actuator configured to translate a cutting element in a first direction that is mounted on a first support arm and at least one second linear actuator configured to translate at least said first support arm in an orthogonal direction to the first direction. The apparatus may further include a controller operably coupled to the at least one conveyor and the at least one linear actuator for operating the automated container cutting apparatus.

In one embodiment, the present disclosure relates to a method for automatically cutting a container. The method may comprise detecting that a container has been inserted into the cutting apparatus, operating conveyors to position the container in a first direction, actuating a cutting mechanism to engage the container, driving a cutter against one side of the container, driving another cutter against an adjacent second side of the container; and ejecting the container from the cutting apparatus.

These and other features and characteristics of the present invention, as well as the methods of operation and functions of the related elements of structures and combinations of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended to unduly limit the present invention. As used in the specification and the claims, the singular form of "a", "an", and "the" include plural referents unless the context clearly dictates otherwise.

BRIEF DESCRIPTION OF THE DRAWINGS

It is noted here that various figures shown and discussed herein are for illustrative purpose only, and are not necessarily drawn to scale. The figures facilitate discussion of an automated container cutting apparatus according to one or more embodiments of the present disclosure without necessarily limiting the configuration of the apparatus to the dimensions, designs, or illustrations depicted therein.

DETAILED DESCRIPTION

Figure 1:
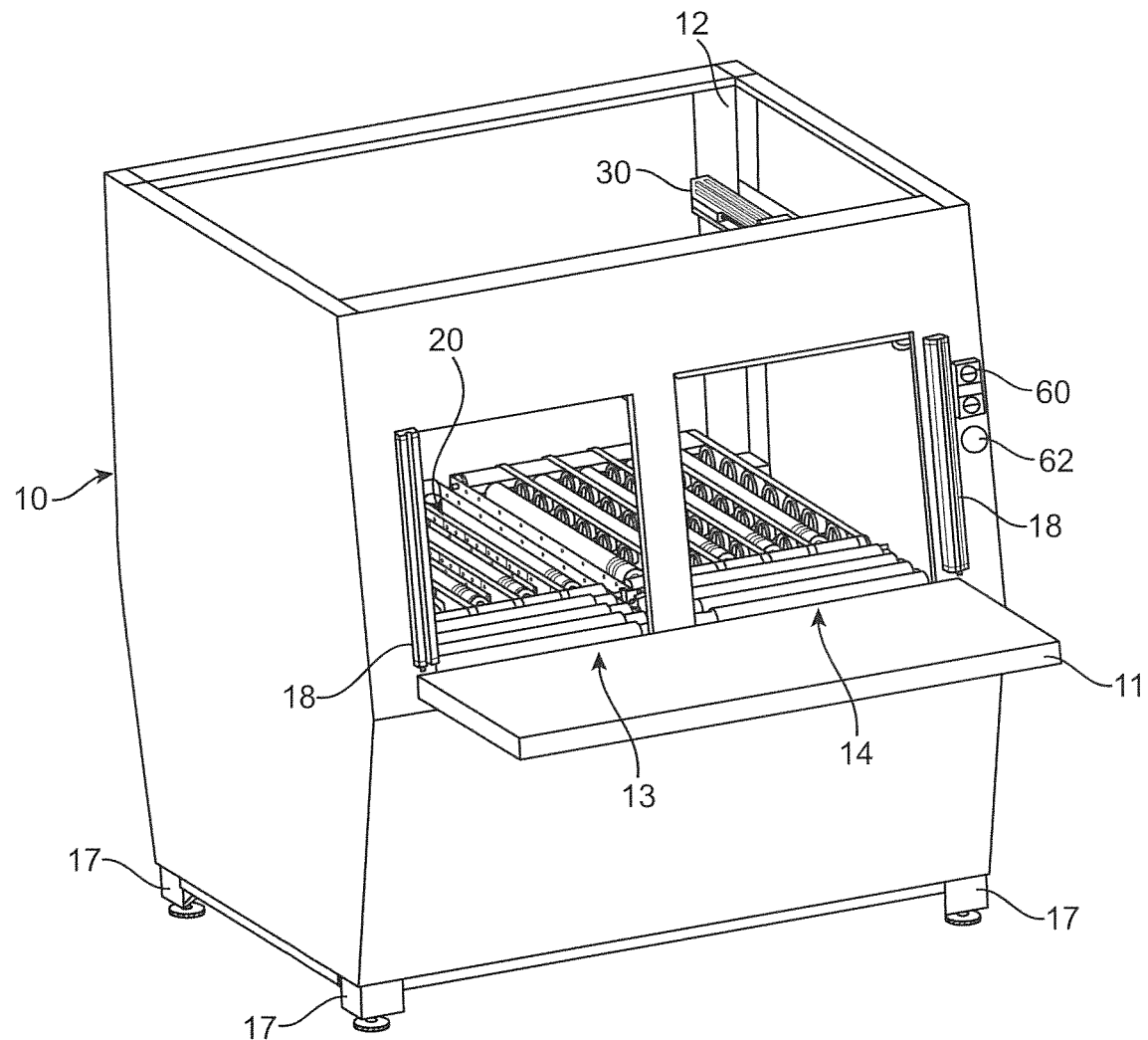
FIG. 1 is a perspective view of an embodiment of an automated container cutting apparatus in accordance with certain teachings of the present invention.

For purposes of the description hereinafter, the terms "upper", "lower", "right", "left", "vertical", "horizontal", "top", "bottom", "lateral", "longitudinal" and related derivatives thereof shall relate to the invention as it is oriented in the drawings. However, it is to be understood that the present invention may assume various alternative variations, except where expressly specified to the contrary. It is also to be understood that the specific devices and configurations illustrated in the attached drawings, and described in the following specification, are simply exemplary embodiments of the invention. Hence, specific dimensions and other physical characteristics related to the embodiments disclosed herein are not to be considered as unduly limiting.

Figure 2:
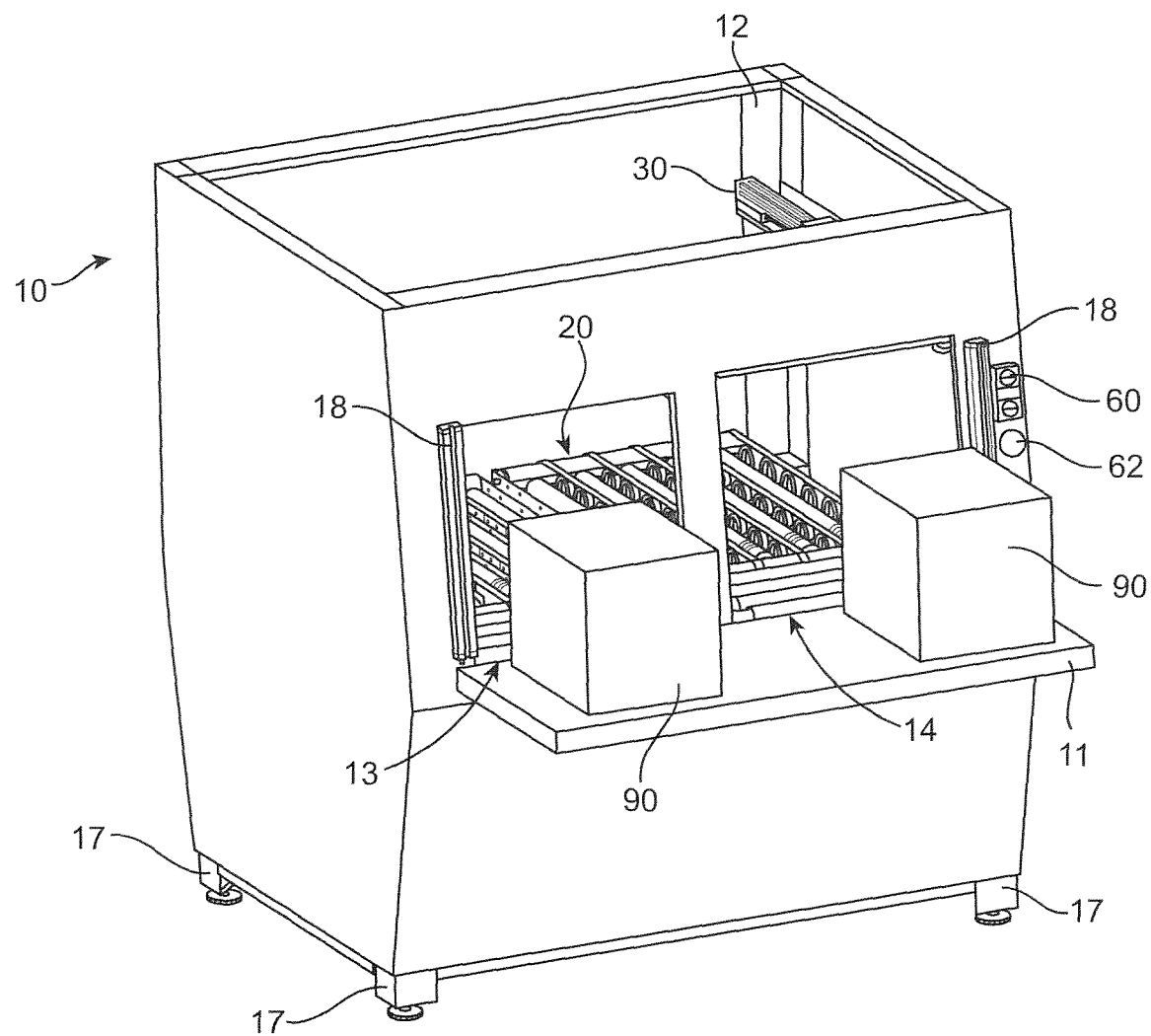
FIG. 2 is a perspective view of the embodiment of the automated container cutting apparatus shown in FIG. 1 as may be employed with containers in accordance with certain teachings of the present invention.

FIGS. 1-2 illustrate an embodiment of an automated container cutting apparatus 10 that may include a shelf 11, an outer frame 12 with configurable feet 17, an internal conveyor system 20, a cutting mechanism 30, a first cutting area 13, a second cutting area 14 and a controller 60 having an indicator 62. The configurable feet 17 may optionally be adjustable to provide leveling capabilities to the frame 12 for optimizing performance. The cutting apparatus 10 may also include ingress/egress sensors 18 near the entrances/exits of the first and second cutting areas 13, 14 as discussed in greater detail below. Cutting apparatus 10 may be manually utilized by one or more users (not shown) to load and unload one or more containers 90 from either side of the frame 12 over the shelf 11.

Figure 3:
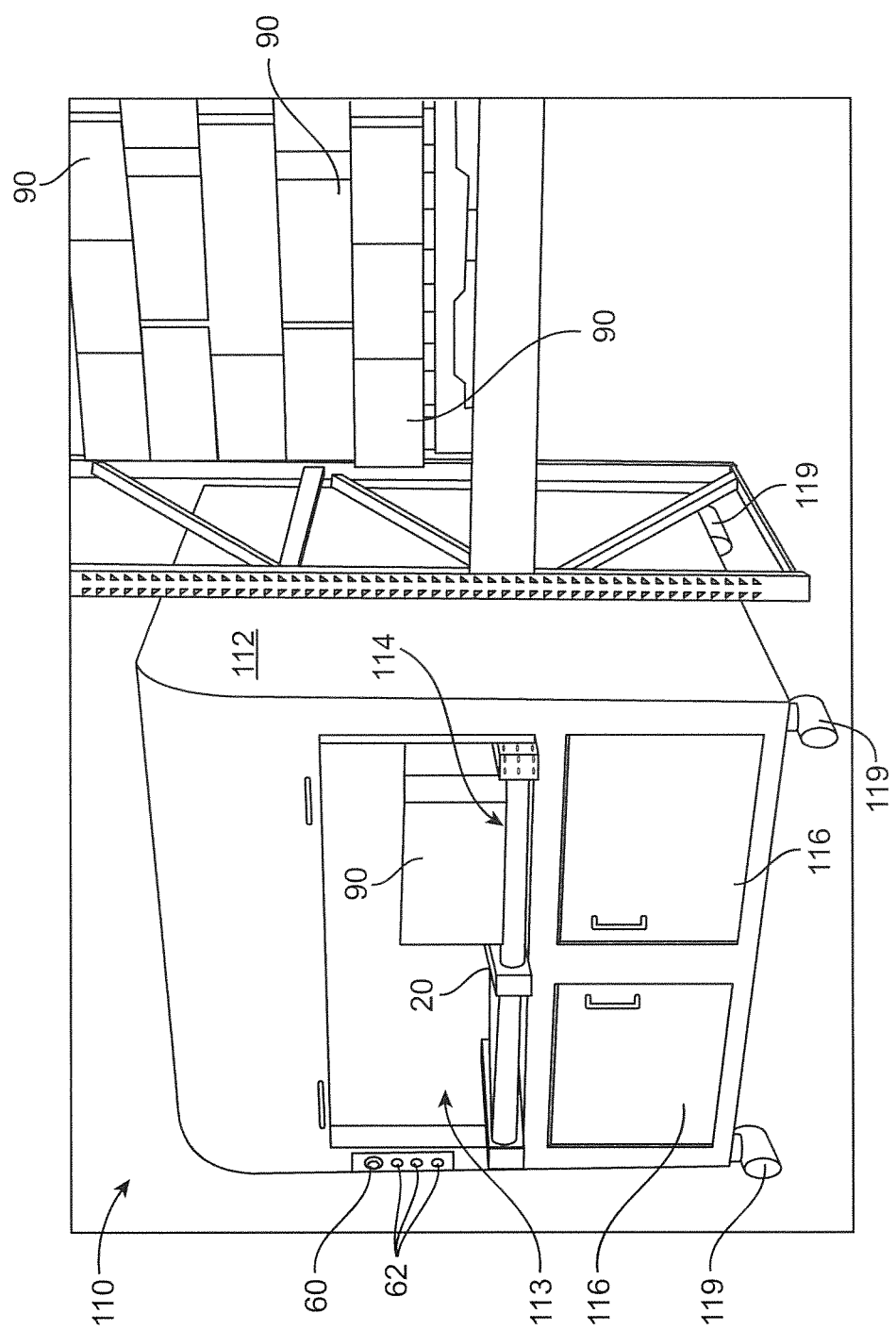
FIG. 3 is a perspective view of an embodiment of an automated container cutting apparatus as it may be situated in an operating environment in accordance with certain teachings of the present invention.

In one embodiment, and as can be seen in FIG. 3, an automated container cutting apparatus 110 may include an outer frame 112 supported by one or more casters 119 and one or more doors 116 incorporated into the frame 112. Similar to cutting apparatus 10, the embodiment illustrated in FIG. 3 of the cutting apparatus 110 includes an internal conveyor system 20, a cutting mechanism (not shown), a first cutting area 113 adjacent a second cutting area 114 and a controller 60 having one or more indictors 62. The cutting apparatus 110 may conveniently provide access to the underside of the conveyor system 20 and/or provide storage space inside the frame 112 via doors 116. Accordingly, apparatus 110 may be manually utilized by one or more users (not shown) to load and unload one or more containers 90 from one side or the other of the cutting apparatus 110 while being conveniently repositionable via casters 119.

As can be seen in FIGS. 1-3, each cutting apparatus 10, 110 requires minimal space and weight such that positioning and handling of each cutting apparatus 10, 110 is made convenient for a wide range of applications in various operating environments. Accordingly, the outer frames 12, 112 may be constructed of lightweight and adequately sturdy materials while preferably being supported by casters 119 for easy movement within an operating environment.

As will be discussed in greater detail below, containers 90 entering the cutting apparatus 10, 110 can have different and unknown dimensions, and the cutting apparatus 10, 110 may be capable of cutting the periphery of the container 90 at a pre-determined distance near a top of a container 90 without determining or receiving the dimensions of each container 90 entering the apparatus 10, 110. Accordingly, the frames 12, 112 may be configured such that the opening to the first cutting area 13, 113 may limit the cross-section of the container 90 that can be processed.

Figure 16:
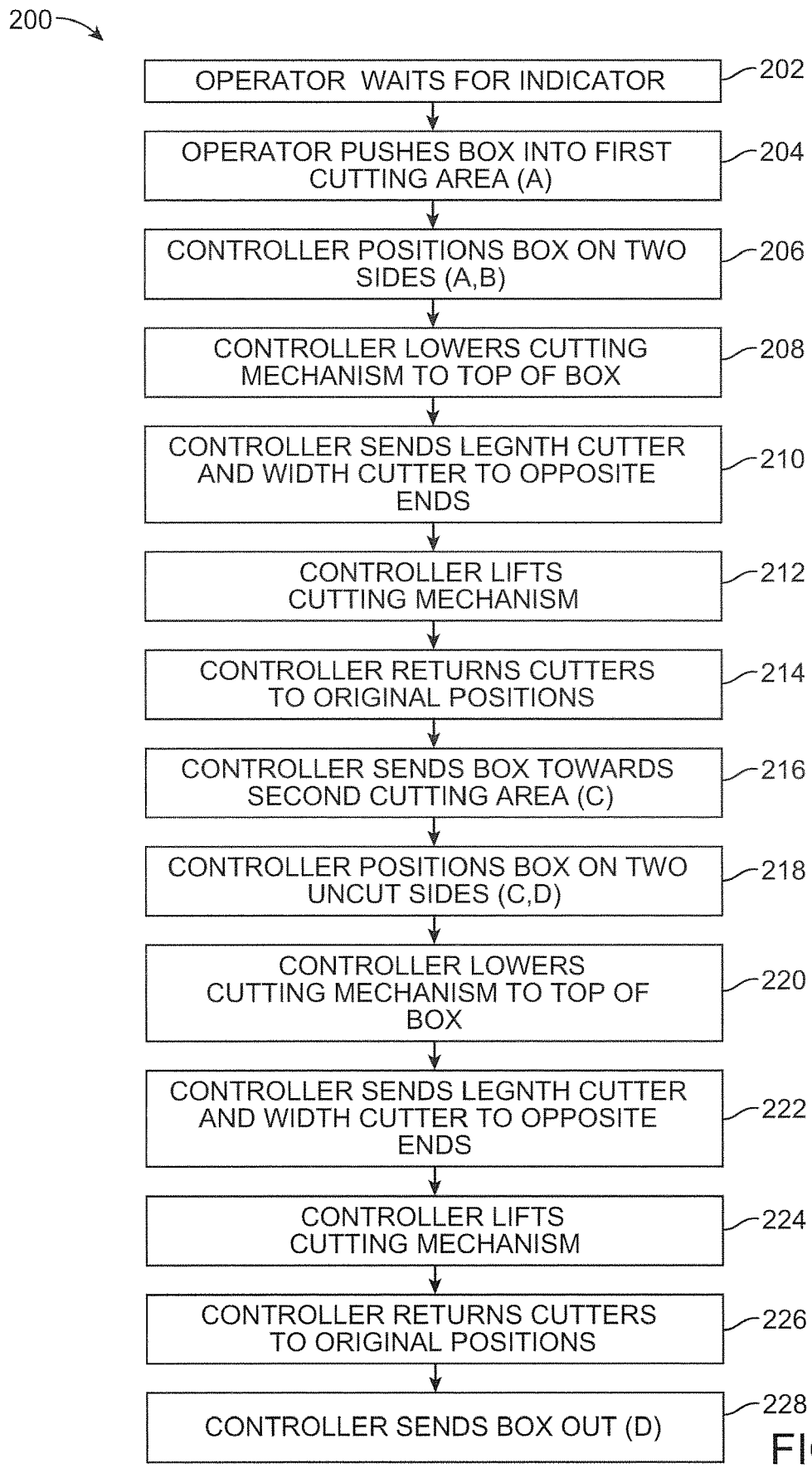
FIG. 16 is a flow chart illustrating an embodiment of a process for operating an automated container cutting apparatus in accordance with certain teachings of the present invention.

With reference to each automated container cutting apparatus 10, 110 described herein, embodiments of the automated container cutting operation process 200 will be described herein and as further illustrated in FIG. 16 in flow chart form.

Figure 4:
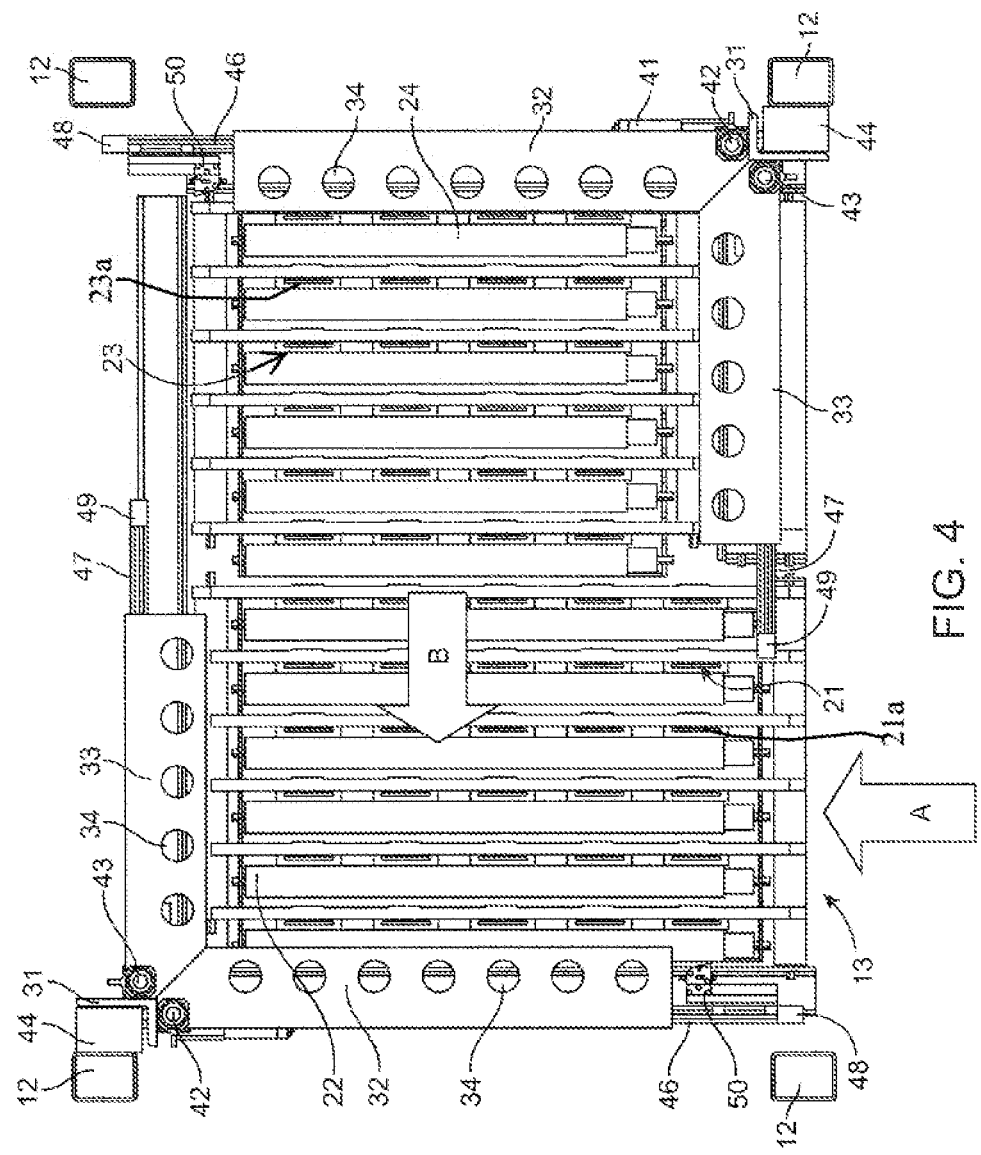
FIG. 4 is a plan view of an embodiment of an internal conveyor system and one or more cutting mechanisms in accordance with certain teachings of the present invention.
Figure 5:
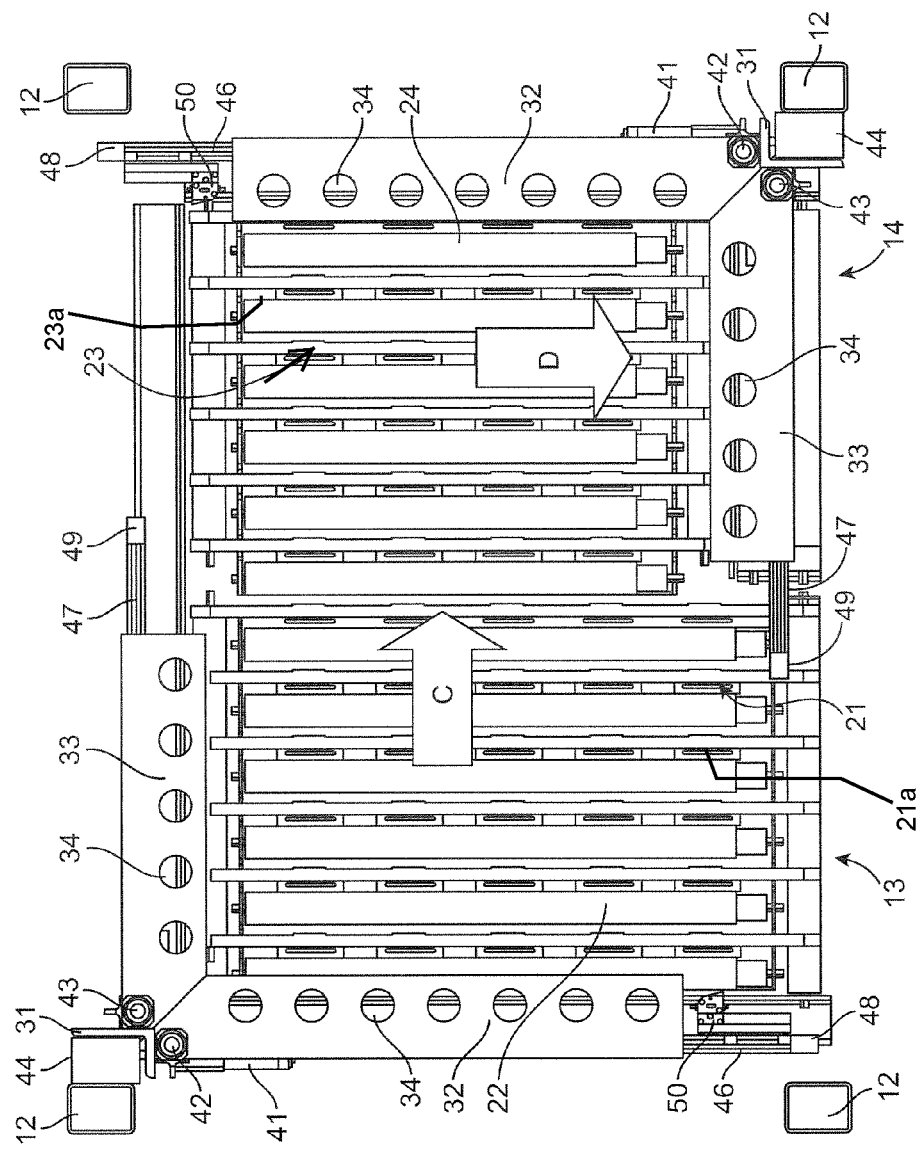
FIG. 5 is a plan view of the embodiment of the conveyor system and cutting mechanisms shown in FIG. 4 in accordance with certain teachings of the present invention.

As can be seen in FIGS. 4-5, each automated cutting operation may require securely positioning the container 90 on two sides at a time into first and second cutting positions in the first and second cutting areas 13, 14, respectively, by conveying or positioning the container 90 in multiple directions such as A, B, C, and D. The internal conveyor system 20, may thus be configured to position the container 90 into the first cutting area 13, 113 and the second cutting area 14, 114 via one or more right angle transfers and/or rollers/conveyors without physical operator interaction as described in greater detail below.

The conveyor system 20 may include a first roller transfer conveyor 21 that may include of a plurality of powered rollers 21a configured to direct the container 90 in a first direction A as shown in FIG. 4. The first conveyor 21 may be configured to engage with the bottom of the container 90 for positioning the same in the direction A for transfer necessary to complete a first cutting operation. In addition, the conveyor system 20 may include a first right angle set of powered rollers 22 to redirect the container 90 in a second direction B. The first conveyor 21, as well as the first right angle rollers 22, may be configured for forward and reverse motion. Accordingly, containers 90 can be moved forwards and backwards and left or right as determined by the controller 60, including reversing the first right angle rollers 22 to move the containers 90 in a third direction C which is opposite second direction B.

The conveyor system 20 may further include a second right angle set of powered rollers 24, which may include a plurality of powered rollers to continue to direct the container 90 in the third direction C. In addition, the conveyor system 20 may include a second roller transfer conveyor 23 that may include of a plurality of powered rollers 23a between the second right angle rollers 24 to direct the container 90 in a fourth direction D as shown in FIG. 5. The rollers 24 and conveyor 23 may be configured to actuate to engage with the container 90 for the direction of transfer necessary to complete a second cutting operation. The second roller conveyor 23, as well as the second right angle rollers 24, may further include configurations for forward and reverse motion. Accordingly, containers 90 can be moved forwards and backwards and left or right as determined by the controller 60.

In operation, user/operator may observe the indicator 62 for a desired status before beginning use of the automated cutting apparatus 10 as discussed in greater detail below (Step 202). Once satisfied, the user/operator may present the container 90 into the first cutting area 13 over the shelf 11 and toward the first cutting area 13 through the frame 12 of the cutting apparatus 10 (Step 204). As will be understood within the embodiments of the present invention, other equipment may be used to feed the container 90 into the cutting apparatus 10 such as, for example, gravity feed conveyors, flex conveyors and/or various powered conveyors.

In addition, the ingress/egress sensors 18 may be configured to provide a safety barrier to guard the openings of the automated cutting apparatus 10, 110. Various types of sensors may be employed including infrared, light/laser barrier, etc., which may be muted and/or disengaged when the cut operation is not active allowing a single container 90 to be loaded into the first cutting area 13, 113. After the container 90 is pulled inside the frame 12, 112 by the first conveyor 21 in the direction A, the ingress/egress sensors 18 may be activated. If an operator/user (not shown) attempts to place their hand or another container 90 through the portal, all active cut processes may be stopped by the controller 60 to prevent injury and/or damage to the cutting apparatus 10, 110. In addition, the one or more indicator lights 62 may be provided to signal the breach and/or status of the cutting operation (e.g. red/green light) near the controller 60 to inform the operator/user when to load and when not to load containers 90. This action prevents untimely loading of containers 90 and unintended ingress/egress safety breaches.

During the loading of the container 90 inside the frame 12, 112, this activity may be automatically sensed causing activation of the first conveyor 21 to pull the container 90 into the first cutting area 13, 113 past the safety barrier. If the container 90 is not sensed by the ingress/egress sensors 18, the controller 60 may remain in the ready to load state and not activate first conveyor 21. Accordingly, first roller transfer conveyor 21 pulls the inserted container 90 forward in the direction A to the end of the conveyor 21. The length of the conveyor is long enough to accommodate the maximum length container 90 with adequate space between the end of the container 90 and the frame 12, 112 opening. Prior to the container 90 arriving at near the first cutting area 13, 113, the cutting mechanism 30 may be in a lifted position above the maximum height of the container 90.

Accordingly, the first roller conveyor 21 may draw the container 90 inside the frame having only its narrow conveyance system activated with a front to back motion in one example. The container 90 will then be drawn inside the frame 12, 112 until the leading edge of the container makes contact with the end of the conveyor 21. In other embodiments, a rear fence (not shown) and/or guide (not shown) may be implemented to stop the travel of the container 90 in the direction A. In yet another embodiment, a photo (not shown) monitoring the area to determine the appropriate distance of travel for the container 90 may be provided. The trailing end of the container 90 may also be checked via ingress/egress sensors 18 in some embodiments to ensure it clears the opening in the frame 12. If the container 90 blocks one or more sensors, the controller 60 may determine that the container 90 exceeds the maximum length and will be ejected by reversing the direction A from back to front out of the apparatus 10.

Upon the container 90 reaching the end of the first conveyor 21, first rollers 22 may be raised and/or the first conveyor 21 lowered so that the bottom side of the container 90 is engaged. Thus, the first right angle set of powered rollers 22 are energized to position the container 90 at a right angle from the previous first direction A. The container 90 then moves in the second direction B until the left side of the container 90 rests against the end of the first rollers 22. The container 90 is now located fully in the first cutting area 13 along two sides (i.e. the length (left side) and width (leading edge)) of the container 90 (Step 206).

In alternate embodiments, proximity sensors (not shown) may be employed to detect if the container 90 is in position against both hard stops, wherein the first rollers 22 and/or first conveyor 21 may need to be engaged again to attempt to position the container 90 along the hard stops. Two or more attempts may be made as desired until the container 90 is positioned in the first cutting area 13 before the container 90 is ejected out the entrance of the frame 12, 112 by the controller 60.

Figure 6:
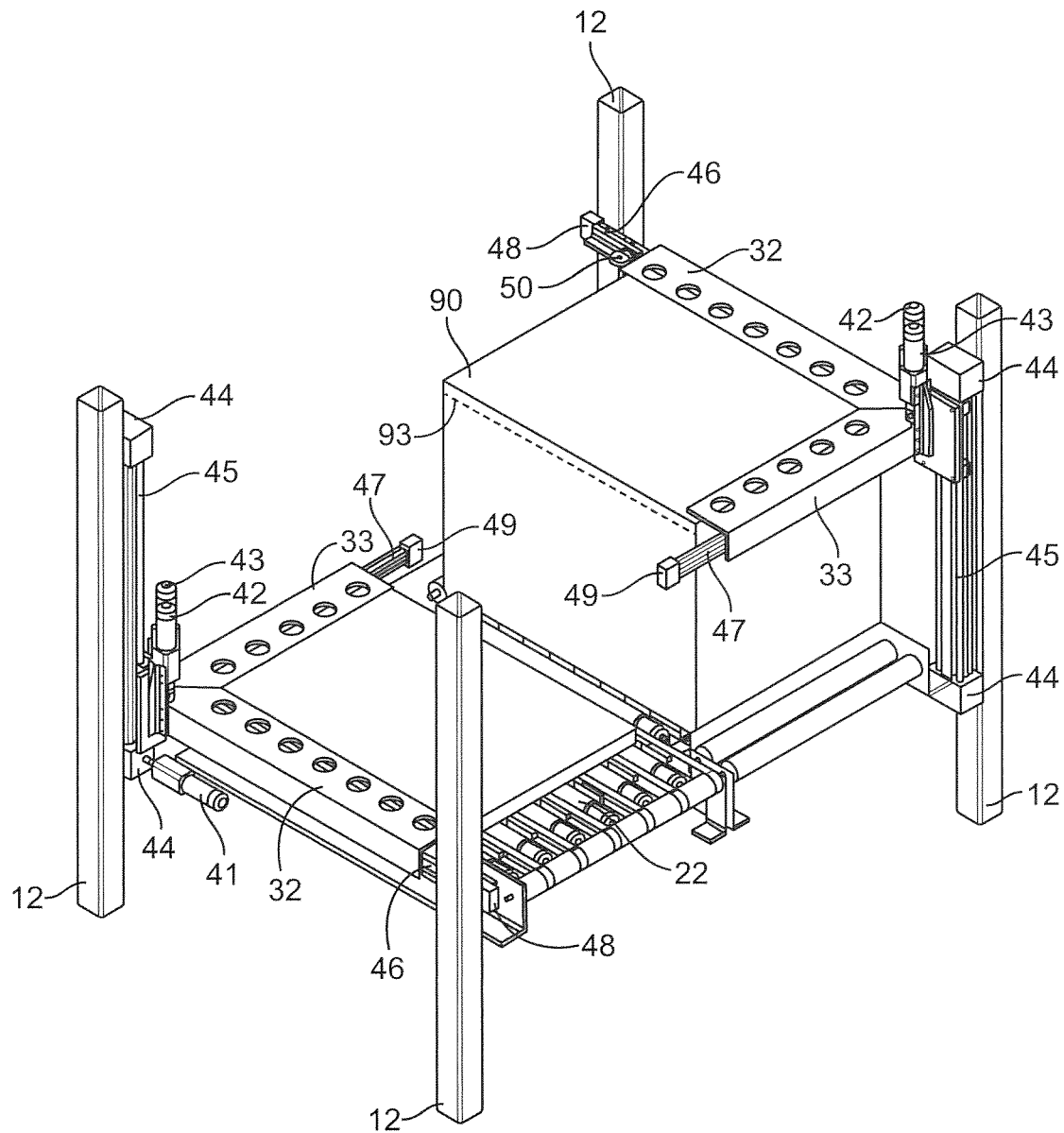
FIG. 6 is a perspective view of an embodiment of an internal conveyor system and cutting mechanisms as may be employed with a container in accordance with certain teachings of the present invention.
Figure 7:
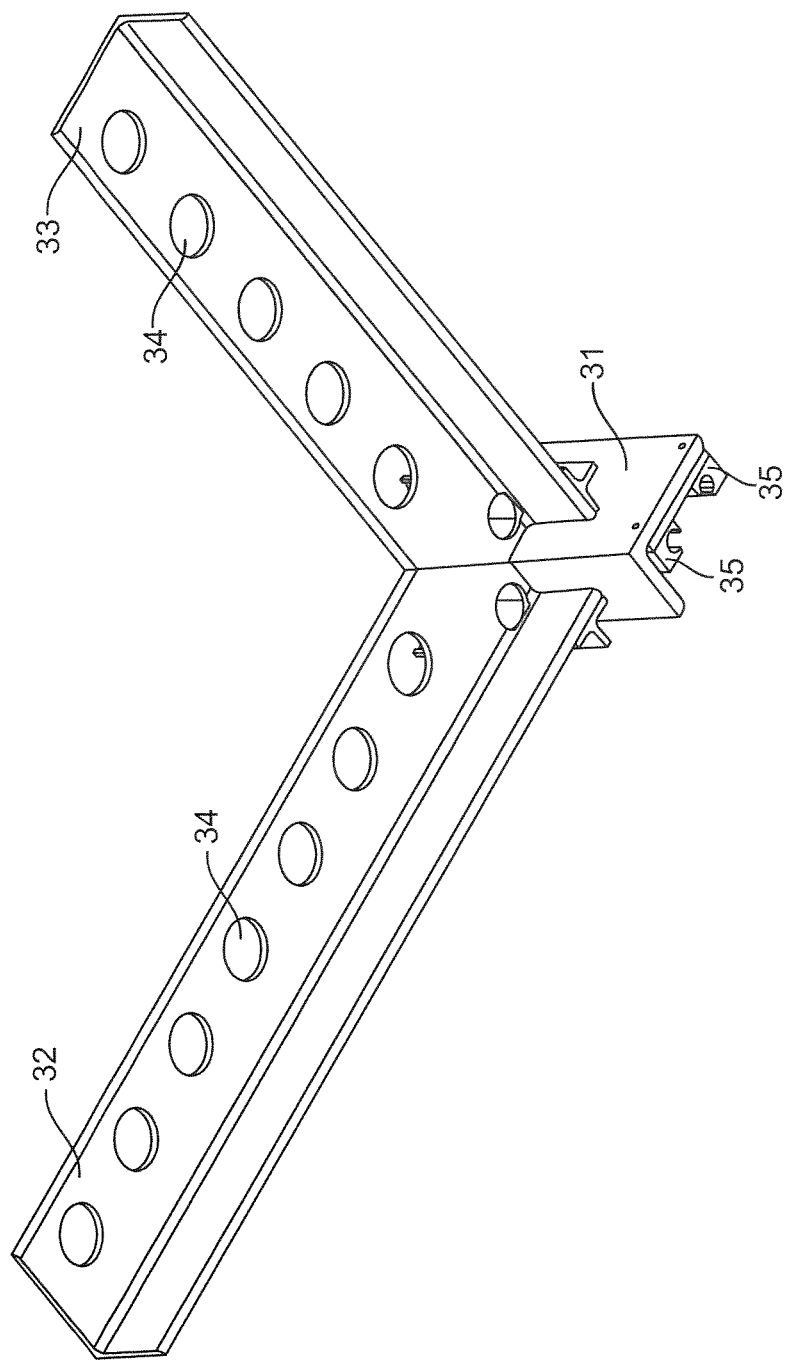
FIG. 7 is a perspective view of an embodiment of a portion of a cutting mechanism in accordance with certain teachings of the present invention.

As can be seen in FIGS. 4-12, the cutting mechanism 30 may utilize several linear axes to position the cutting head 50 about the container 90 along desired cut patterns. Accordingly the cutting mechanism 30 may include a first arm 32 connected to a second arm 33 about a common origin at the corner brace 31 as shown in FIG. 7. Each arm 32, 33 may be preferably positioned in the some horizontal plane along two different vectors at right angles to one another. In addition, in order to position the cutting mechanism 30 in a desired vertical orientation, vertical rail guides 35 may be provided and positioned within the corner brace 31. In addition, one or more apertures 34 may be provided in the arms 32, 33 to increase visibility, repair-ability while reducing weight to reposition the cutting apparatus 10, 110.

Figure 8:
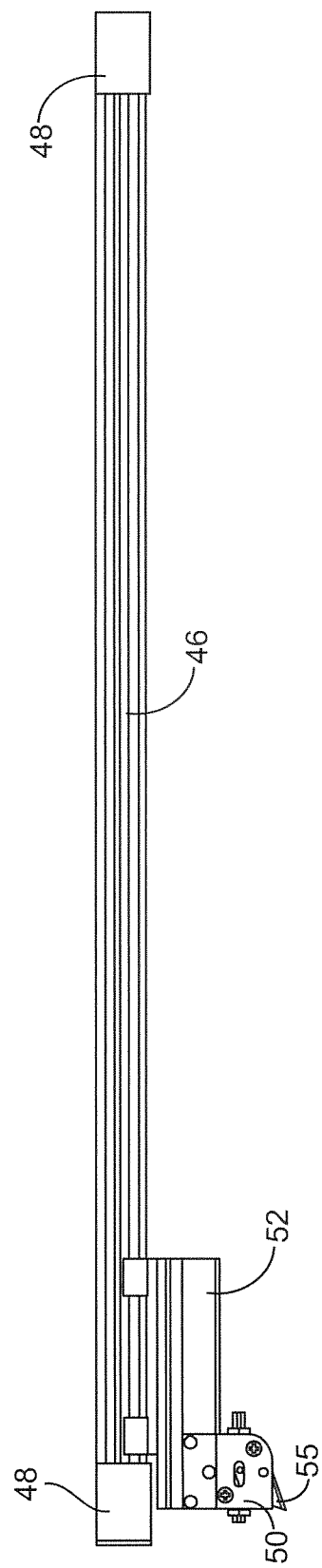
FIG. 8 is a perspective view of an embodiment of a portion of a cutting mechanism in accordance with certain teachings of the present invention.
Figure 9:
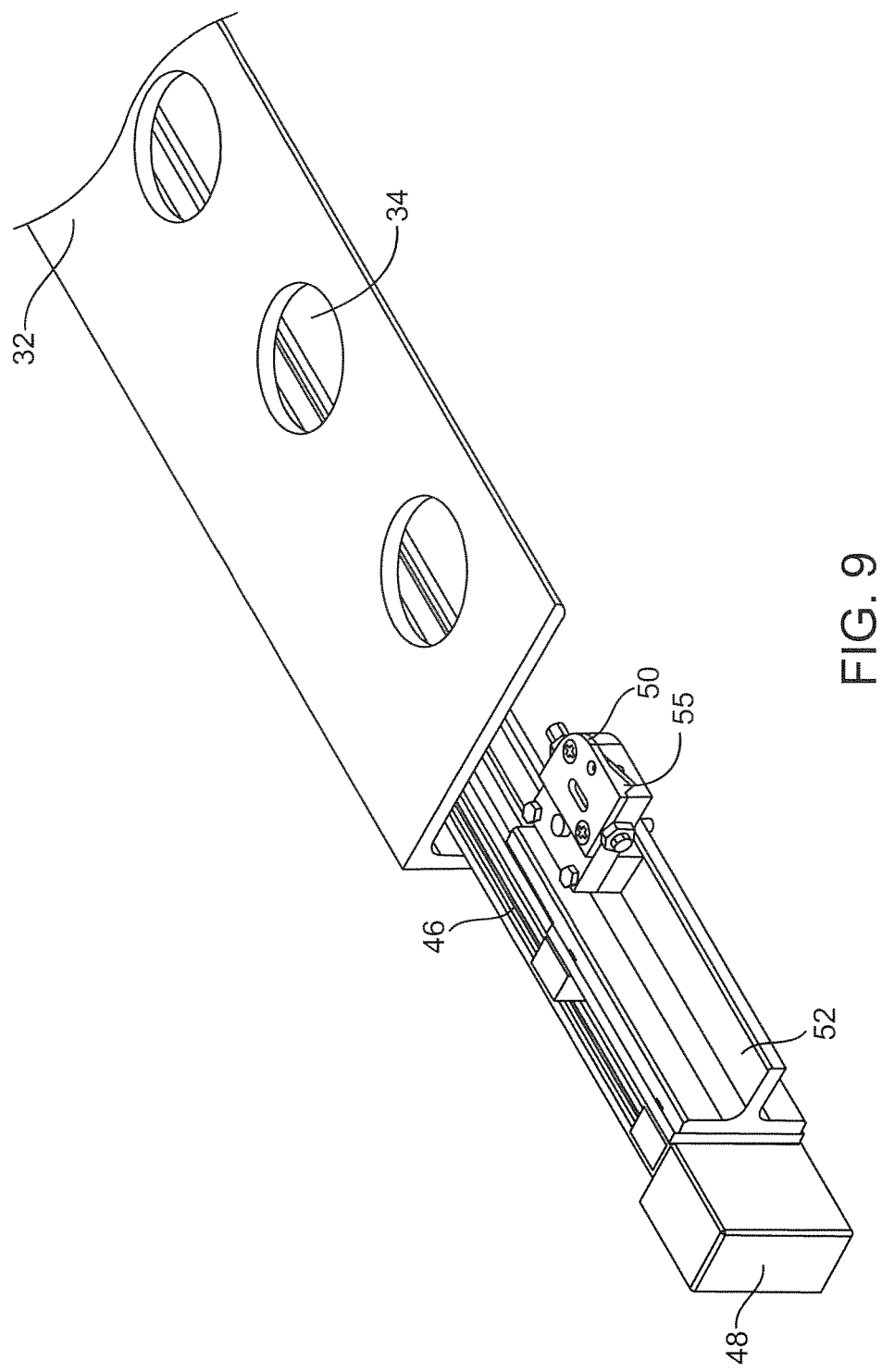
FIG. 9 is a partial perspective view of an embodiment of a cutting mechanism in accordance with certain teachings of the present invention.

As can be seen in FIG. 8, the cutting head 50 may have a cutter 55 and be translated along first linear rail 46, coupled via mount 52. The travel of the cutting head 50 may be limited by first stops 48 positioned at either end of the first linear rail 46. Likewise, as can be seen in FIGS. 10-11, another cutting head 50 may be translated along a second linear rail 47 between a pair of second stops 49.

The cutting mechanism may also preferably translate the first and second arms 32, 33 vertically along a vertical rail 45. See FIGS. 10-12. This positioning may be orthogonal to the horizontal plane of the cutting heads 50 translational positioning. Thus, with vertical adjustment provided for the first and second arms 32, 33, resting or home positioning of each cutting head 50 may be above the height of the maximum container 90 size handled by the automated container cutting apparatus 10, 110.

In order to drive the cutter heads 50 to and from their respective stops 48, 49, a vertical drive 41, first drive 42 and second drive 43 may be provided and in communication with the respective mounts 52. These drives 41-43 may be a commercially available rodless cylinder, a motor controlled lead screw, a motor controlled belt drive, pneumatic or stepper motor, or a custom-built device. Both the horizontal drives 42, 43 are comprised of similar components with the vertical drives 41 consisting of linear guides, cutting element and electric or pneumatic drive mechanisms. In the present embodiment, the drives 41-43 may be custom built electric belt drive actuators driven by motors compatible with the conveyor controller 60.

Figure 10:
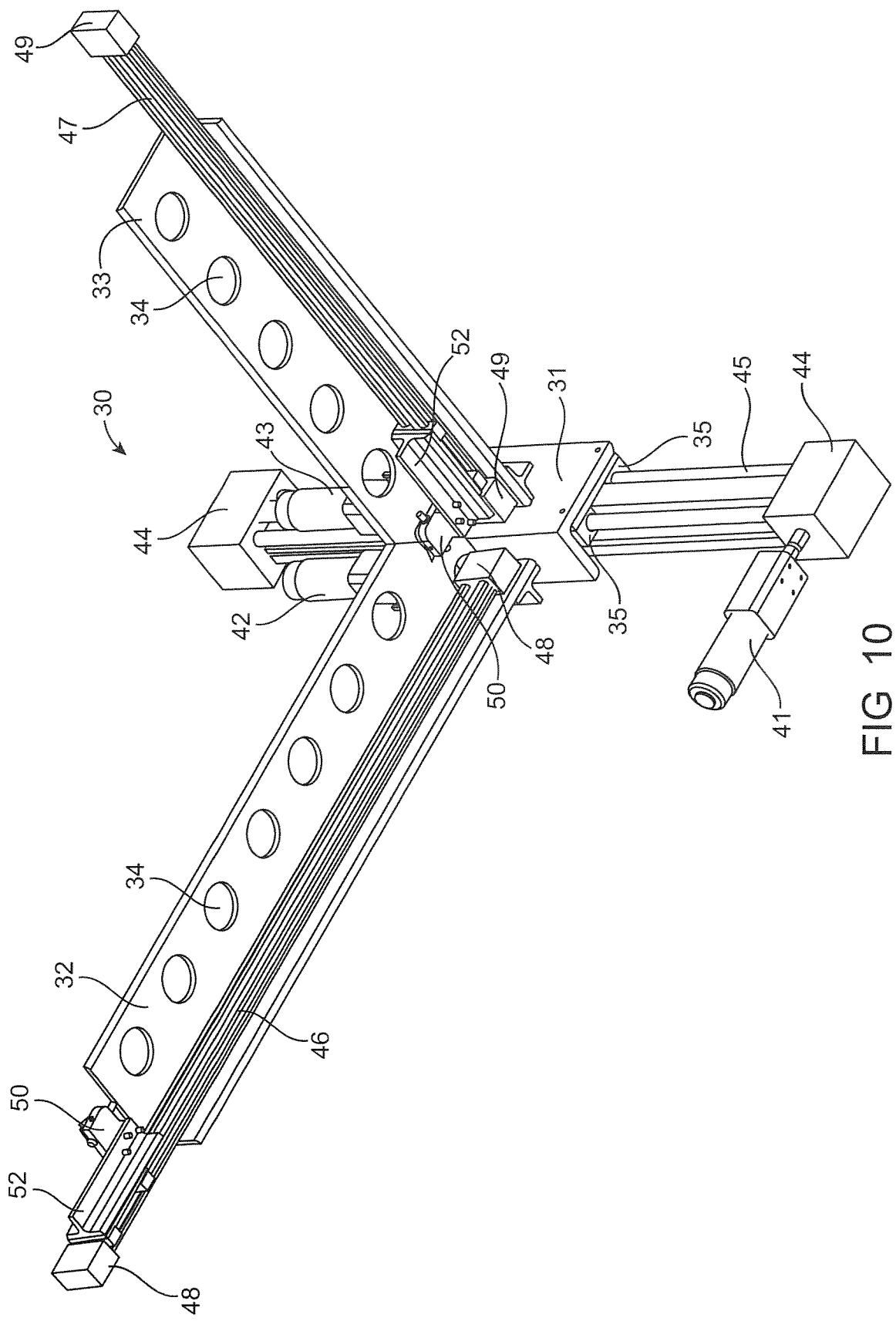
FIG. 10 is a perspective view of an embodiment of a cutting mechanism in accordance with certain teachings of the present invention.
Figure 11:
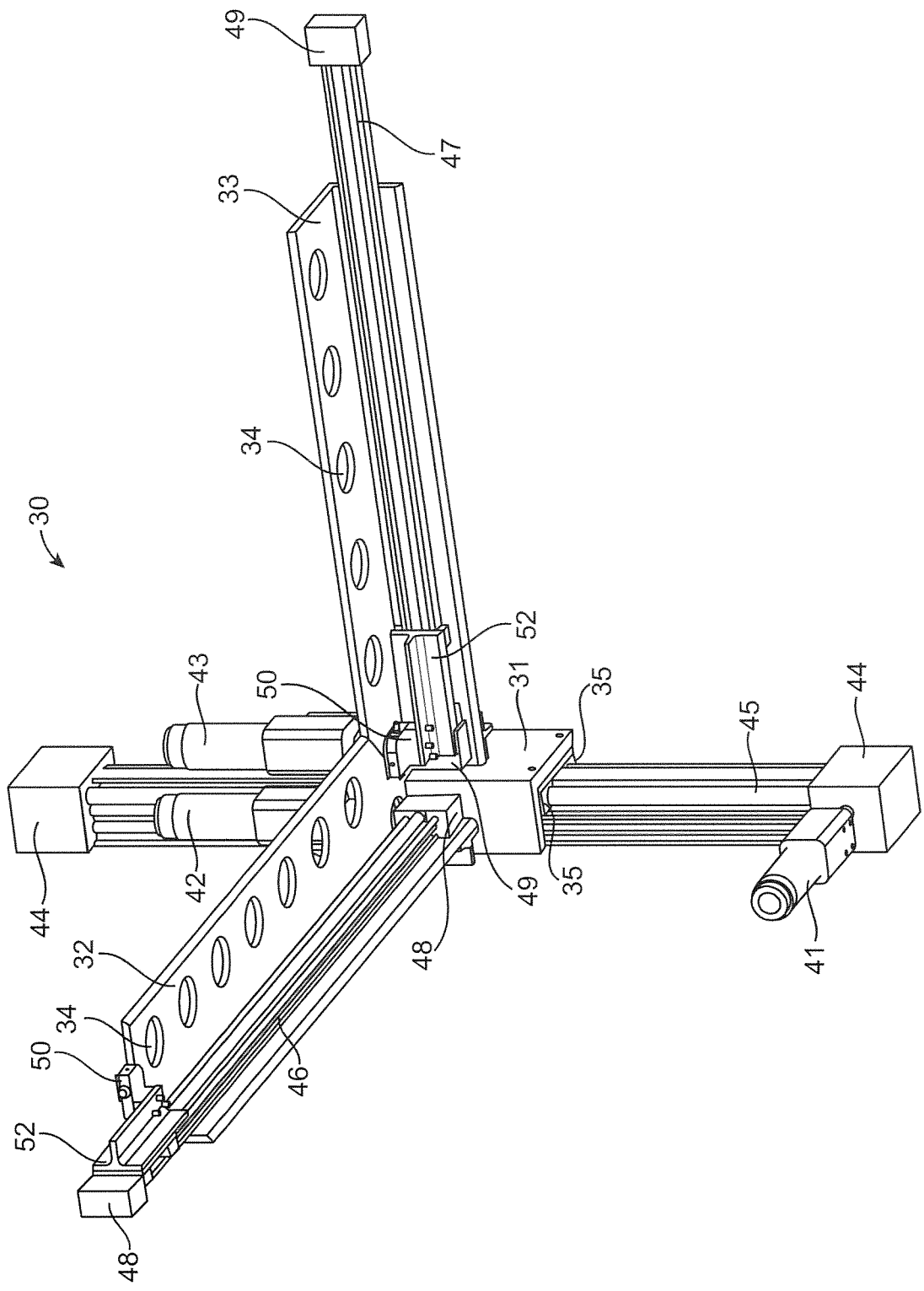
FIG. 11 is a perspective view an embodiment of a cutting mechanism in accordance with certain teachings of the present invention.

As best shown in FIGS. 6, 10-11, the vertical drive 41 may be mounted to the vertical stop 44 for translating the first and second arms 32, 33 up and down, while the first drive 42 may be mounted to the first stop 48 and the second drive 43 may be mounted to the second stop 49 to translate the cutting heads 50 side-to-side for cutting containers 90. Further, and as discussed herein, the cutting head 50 with its cutter 55 may be thus coupled to the mount 52 in order to translate the length of the linear rails 46, 47.

With the container 90 now fully in the first cutting area 13, the controller 60 may then send the cutting heads 50 down the vertical rail 45 from its home position above the maximum height container 90 (as controlled by the frame 12 entrance). The vertical drive 41 is designed to stall when contact with the container 90 is made without damage to the container 90. Accordingly, the support structure of the first and second arms 32, 33 make contact with the container 90 securing the same in position on the top of the container 90 (Step 208). Alternatively, the controller 60 may sense contact with the top of the container 90 via a proximity sensor and/or change in current of the vertical drive 41. If desired, additional clamping force may be provided wherein the vertical drive may encourage more contact with the container 90 and/or actuate a brake (not shown) to ensure the container 90 stays positioned in the first cutting area 13.

In the first cutting area 13, cutting heads 50 maybe be dedicated for cutting two sides of the container 90 having a common corner. Thus, all four sides of the container 90 are cut in two cutting operations. As can be seen in the FIGS. 6-12, the linear rails 46, 47 permit the cutting head 50 to travel horizontally cutting the container 90. These cutting heads 50 do not know the length of the container 90 wall being cut but rather run to the full extent of travel to the stops 48, 49 to insure the entire length on that side of the container is cut 93.

Accordingly, with the container 90 clamped in the first cutting area, the controller 60 energizes the first and second drives engaging the cutting head 50 and blade 55 with the respective sides (length and width) of the container 90. (Step 210) The first and second drives will have sufficient thrust to move the blade 55 through the container 90 material. The drives 42, 43 may stay energized until the cutting head 50 reaches the extent of its travel regardless of the container 90 size. Each linear cutting head 50 has sufficient stroke to travel beyond the complete distance of the maximum sized container 90 for the X axis (width) and Y axis (length). The cutting head 50 of one axis is offset to allow the overlap of position with the other axis at the origin near the corner brace 31. Further, in one embodiment, if the opposite end is not reached within a time measured by the controller 60, the drives 42, 43 may be stopped then reversed to clear the blade 55 from the container 90.

Figure 13:
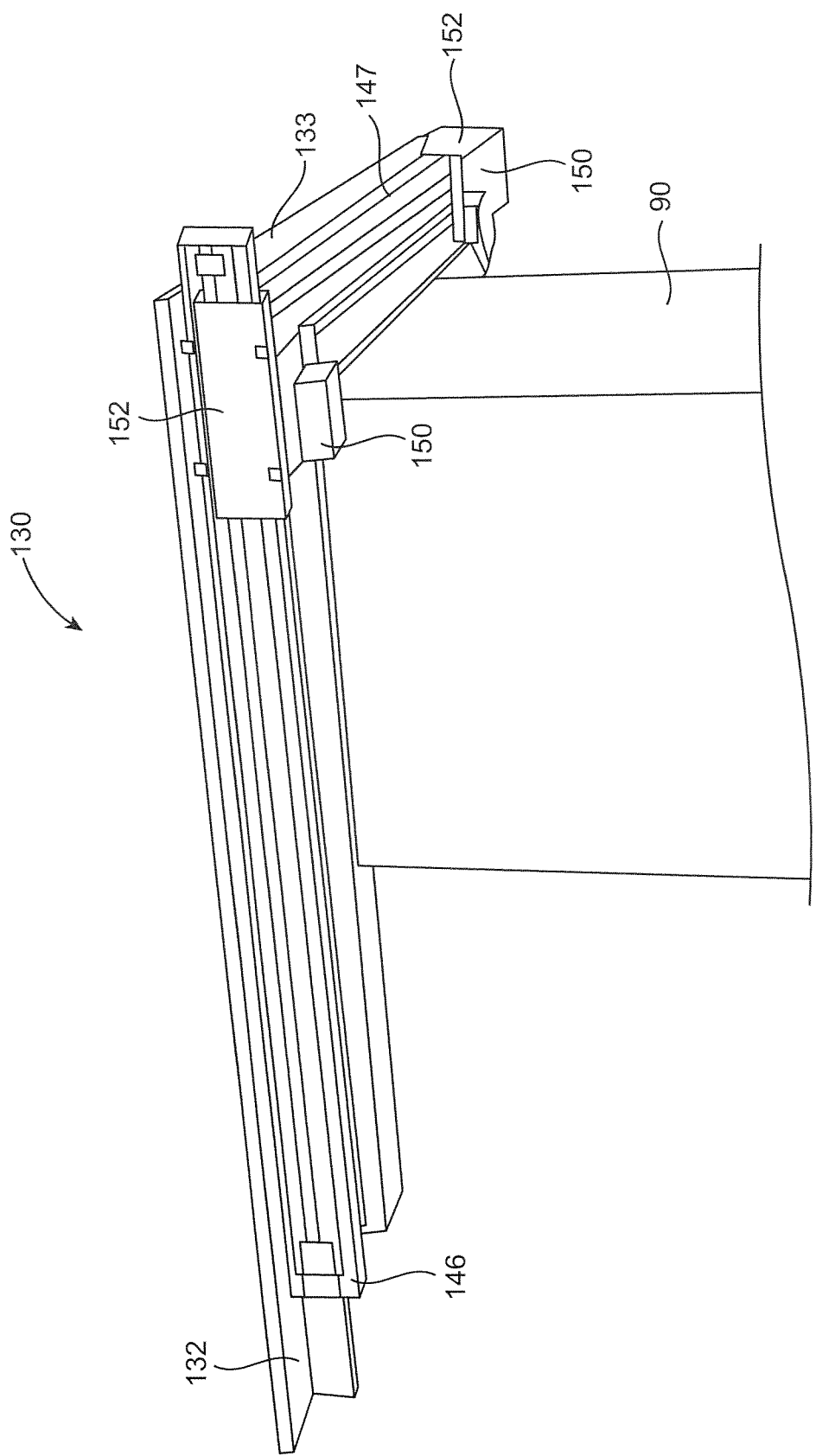
FIG. 13 is a perspective view of an embodiment of a cutting mechanism as may be employed with a container in accordance with certain teachings of the present invention.

In another embodiment, as shown in FIG. 13, another cutting mechanism 130 may be implemented wherein first and second arms 132, 133 may be configured similarly to the first and second arms 32, 33. However, this cutting mechanism 130 has outwardly mounted linear rails 146, 147 wherein a mount 152 of a cutting head 150 traverses on the outside of the first and second arms 132, 133. As can be seen, the container 90 may still be adequately cut to enable the user/operator to access the contents of the container 90.

Figure 14:
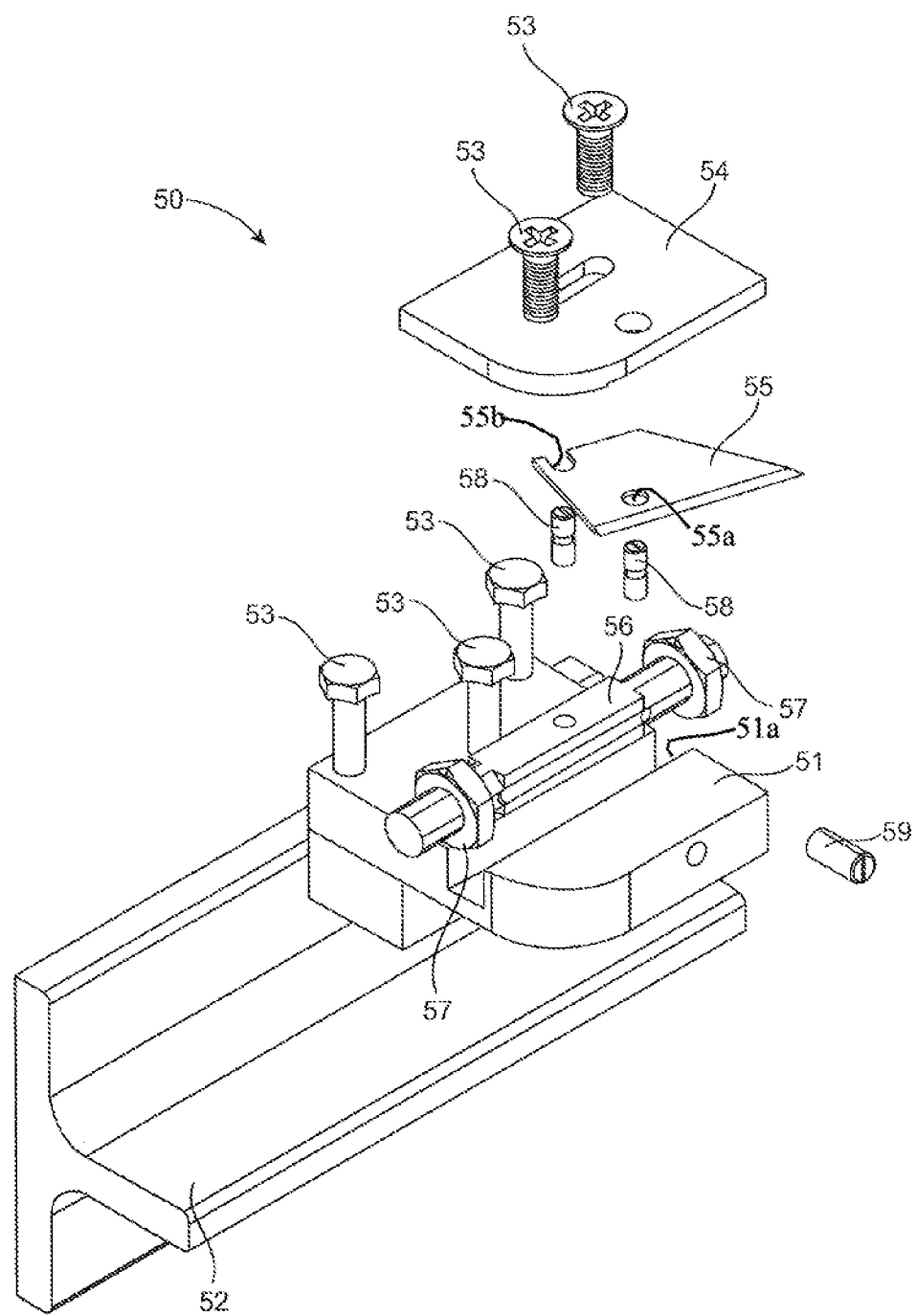
FIG. 14 is an exploded perspective view of an embodiment of a compact cutting head in accordance with certain teachings of the present invention.
Figure 15:
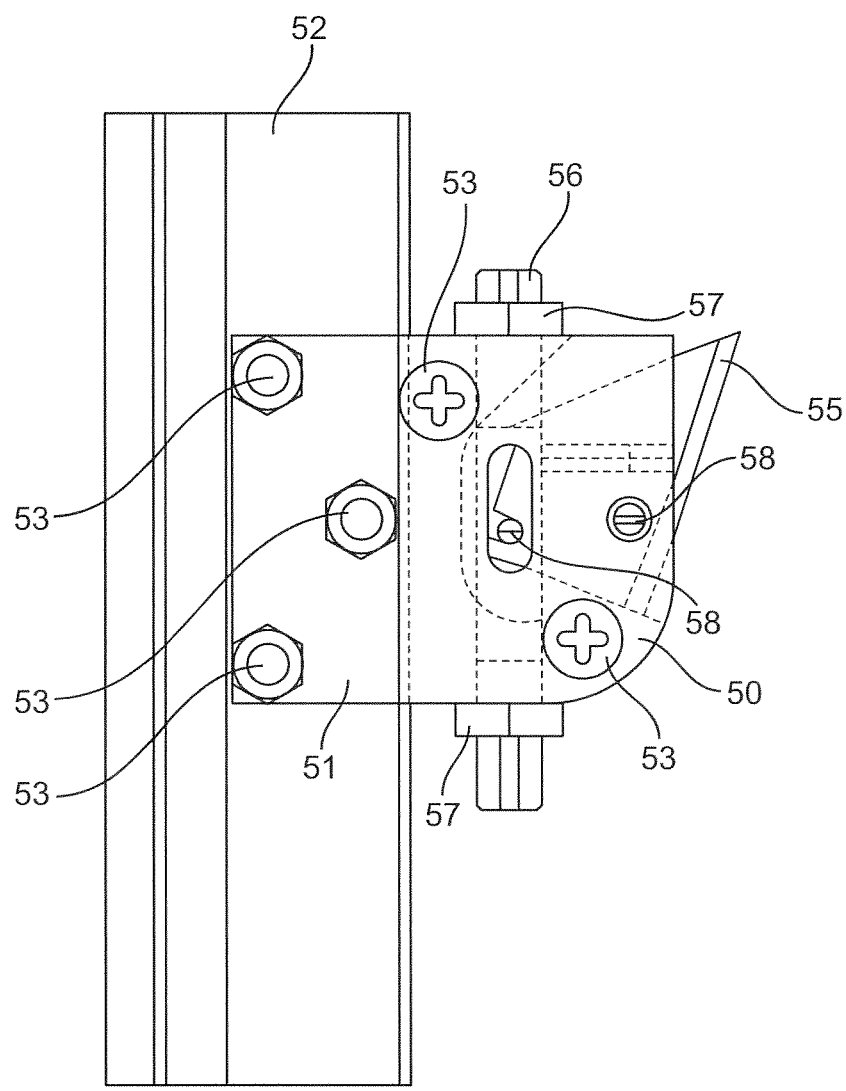
FIG. 15 is a plan view of an embodiment of a compact cutting head in accordance with certain teachings of the present invention.

FIG. 14-15 illustrate the cutting head 50 which is designed to be compact, made by simple machining and offers precise adjustment of cutting depth. The cutting head 50 may use a standard utility knife blade 55 that is cut in half with one hole 55a drilled. The cutting head 50 may thus support the cutting element 55 with manual adjustment for depth of cut 93 via cover plate 54, first and second screw pins 58 and threaded fasteners 53. The cut depth is thus controlled by the distance the blade 55 protrudes from the flat cutting guide surface on a blade housing 51. The rotation of the blade 55 is controlled by a second pin 58 mounted into an adjustment rod 56. The second pin 58 fits in the u shaped cut out 55b in the blade 55 (standard for utility blades).

The blade housing 51 leading edge has a gentle radius as it is the leading edge of contact with the container 90. The rounded edge provides a lead to guide the container 90 edge to the flat cutting guide surface that acts as a hilt to limit the blade 55 depth.

Figure 12:
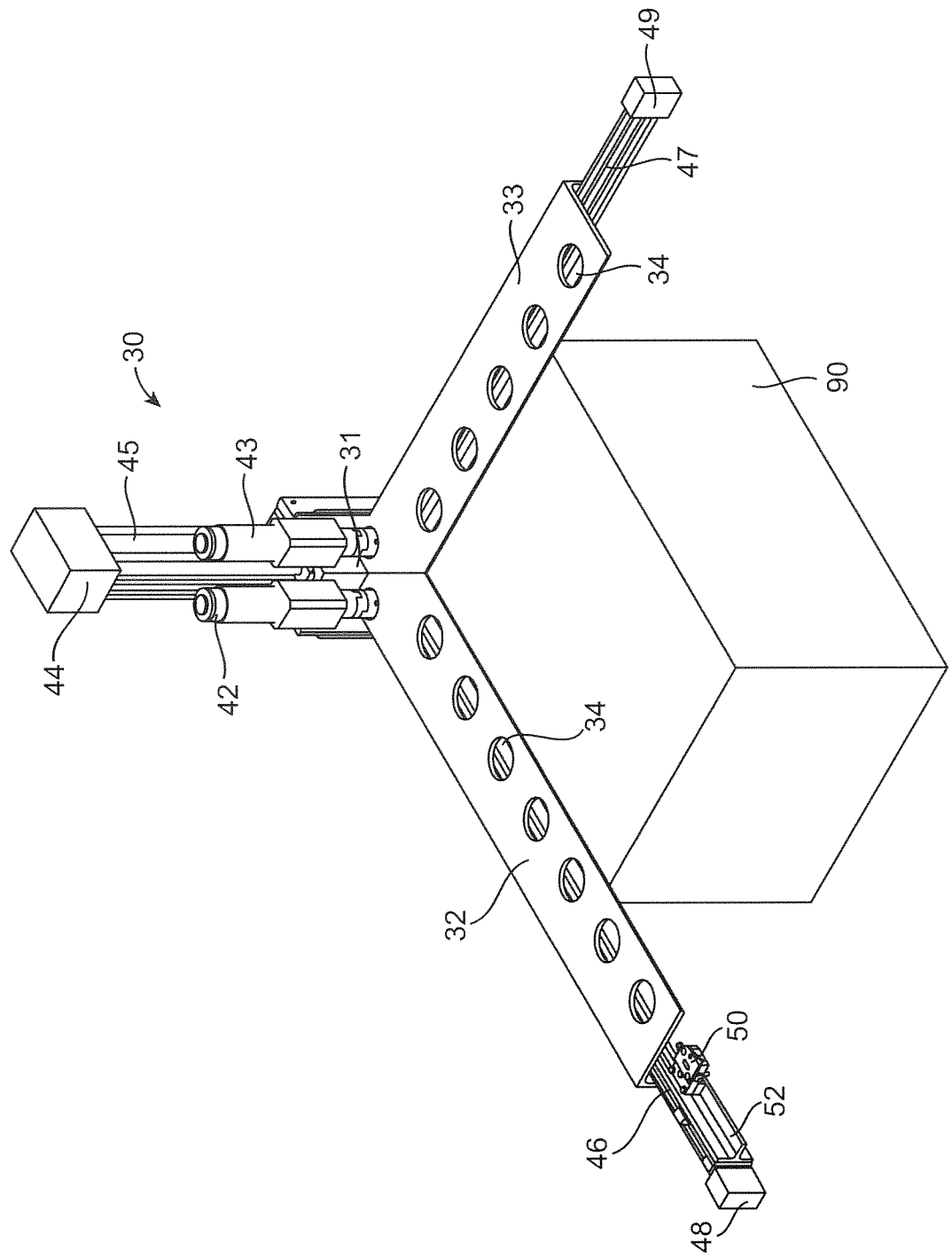
FIG. 12 is a perspective view of an embodiment of a cutting mechanism as may be employed with a container in accordance with certain teachings of the present invention.

The cutting elements 55 may be positioned to cut into the sides of the container 90 as shown in FIGS. 10-12. At least one cutting head 50 has an initial cutter 55 position before the corner of the container 90 near the corner brace 31. The other cutting head 50 may be initially positioned beyond the maximum width or length of the container 90. Both linear cutting heads 50 are positioned to not interfere with the container 90 when lowered onto the container 90 until actuated by the controller 60. Accordingly, each compact cutting head 50 provides horizontal axis cutting that provides high speed cuts 93 of randomly sized containers 90 without need to measure the random sized container 90.

A novel blade depth adjustment for the compact cutting head 50 is shown in FIG. 14. The threaded fasteners 53 may engage the machined blade housing 51 comprising a trough 51a within which the adjustment rod 56 may be positioned. The adjustment rod 56 may be milled on four sides to be square and fit within and secured in the square trough 51a by adjustors 57. One pin 58 may be fixed while the other pin 58 may be anchored in the adjustment rod 56 and moves linearly with turning the adjustors 57. The adjustment rod 56 thus is limited to movement in one axis only. A countersunk pin 59 with a spring loaded ball (not shown) may provide holding pressure to a slot on the side of the adjustment rod 56 to hold it in place when the cover plate 54 is removed for blade 55 changes.

The fine movement of the adjustment rod 56 rotation about the fixed pin moving the cutter 55 in or further out from the housing 51. Accordingly, the housing 51 may be affixed to the mount 52 via threaded fasteners 53 to permit travel along the rails 46, 47 in order to cut 93 the containers 90.

Accordingly, the geometry of the point where the cutting blade 55 interacts with the substrate of the container 90 may be controlled and the point of the center of gravity of the controlling forces, such that the stability of the blade 55 and quality of the cut 93 are improved wherein forces imparted to the mechanism may be minimized. These hard tooled cutting heads 50, affixed to hard tooled linear rails 46, 47 provide stability and controlled cuts 93. Geometry with a designed amount of mechanical trail and caster provides for better stability of the cutter 55 as it cuts though the corrugated container 90. Reactionary forces are greatly reduced or eliminated reducing breakage, pre-mature wear, allowing faster cut speeds and reactionary force imparted on the container 90 reducing clamping force requirements.

The blade 55 can thus be quickly and easily changed after becoming dull from use by removing to cover plate screws 53 and lifting of the cover plate 54 to expose the blade 55 in the assembly housing 51. The blade 55 can be lifted out without force and a new blade 55 dropped into place onto the screw pins 58 setting rotation of the blade 55. The cover plate 54 is replaced and screwed down firmly holding the blade 55 in place. The cover plate 54 is milled to allow room for the blade thickness with a few thousandth of interference to hold firmly when the screws 53 are tight.

Each cutting head 50 on its respective horizontal axis may move past its respective side of the container 90 to allow the vertical drive 43 to lift the support arms 32, 33 and thus unclamping the container 90. After the two sides of the container 90 are cut, each linear cutting head 52 is in juxtaposed positions. Before the Z axis lifts releasing the container 90, the cutting element on each linear device must be clear of the container 90. One cutting head 50 is beyond the maximum dimension of the container 90 the other is beyond the container 90 at the origin. Accordingly, once the initial cutting 93 is performed in the first cutting area 13, the controller 60 may be programmed to disengage the container 90 and lift the cutting heads 50 mounted on the support arms 32, 33 to the home position (Step 212, 214).

The container 90 is then transferred from the first cutting area 13 over to a second cutting area 14 by the controller 60 reversing the first right angle rollers 22 to engage the container in sending it toward the second cutting area 14 in the direction C (step 216). Thus, the container 90 is transferred at a right angle from the rollers 22 to the second right angle rollers 24 for positioning closer to the second cutting area 14. The second rollers 24 transfer the container 90 to conveyor 23 when the controller 60 actuates them to be raised and/or the rollers 24 to be lowered so that the bottom side of the container 90 may then be moved in the direction D after reaching the end of the rollers 24 in the direction C. Accordingly, the container 90 moves to the right (as viewed from the front of the apparatus 10) until the right long side of the container 90 (length) rests against the end of the second rollers 24 and then is transferred to second conveyor 23 to be fully positioned in the second cutting area 14 (Step 218). In alternative embodiments, the controller 60 may actuate a stopping rail (not shown) to stop the container 90 in the second cutting area 14.

The time cutting head 50 is traveling past the container 90 and no cutting action is occurring is not wasted time. The travel past the container 90 end allows the cutting head 50 to index to a safe position as must be done with any other multi-axes system that may measure length and width. Straight line cutting motion may be controlled by the linear guides or bearings (not shown) on the mounts 52 that eliminate requirements for interpolation software or special controls saving cost. Without multi axes interpolation controls, travel speeds can be increase making the extra travel time negligible. Rate enhancements are achieved by eliminating measurement time, transmission time and path calculation time. By using a dedicated cut axis the most rate enhancement occurs with parallel cut actions with the length and width occurring simultaneously on the cutting head 50 on each horizontal axis and in effect reducing them. Fixed linear guides and bearings provide true straight line cutting paths eliminating reactionary forces in various axes that may cause cutting element binding, breakage, pre-mature wear and reactionary force imparted on the container 90 reducing clamping force cut time by half.

The second cutting area 14 and related cutting mechanism 30 is in effect a mirror image of the first cutting area 13 and related cutting mechanism 30. Standard right angle transfers may be used for sorting containers 90 and can be programmed to accomplish several functions in accordance with the present invention. Right angle transfers are typically two conveyors meshed together. One or more conveyer and roller components 21, 22 and 23, 24 lower and rise to engage the container 90 to pass it straight through, pass it off to the left or pass it off to the right. This right angle transfer device may be used to pull container 90 further into the apparatus 10,110 in the direction A. and/or push the container out of the apparatus 10, 110 in direction D. The right angle transfer may further be programmed to stop the forward motion of the container 90 in direction B when the container 90 needs to stop and reverse to send the container in direction C to transfer it to the other right angle transfer 23, 24. Either conveyor/roller 21, 22 or 23, 24 may be programmed to jog the container 90 one or more times until both sides of the container 90 are resting in the appropriate cutting area 13, 14.

As with the first cutting process, in a similar fashion the second cutting area 14 may operate substantially the same. Thus, the controller 60 may lower the cutting mechanism 30 to the top of the container 90 (Step 220), send both cutting heads 50 to the opposite ends of their respective linear rails 46, 47 to cut the container 90 (Step 222), lift the support arms 32, 33 to disengage (Step 224) the container 90 and then return the cutting heads 50 to their original positions (Step 226).

After the last two cuts are made in the second cutting area 14, the container 90 is complete and ready to be conveyed to the front of the apparatus 10, 110 for unloading. The controller 60 activates the second roller transfer conveyor 23 to send the container 90 out of the cutting apparatus 10, 110 in the direction D (Step 228). The container 90 emerges through the exit portal on the operator's right. Additionally, the ingress/egress sensors 18 may communicate to the controller 60 to stop the conveyor 023 when the container 90 arrives at the exit of the frame 12, 112.

The exit portal is adjacent and to the right of the entrance portal. The exit portal also acts as a programmable safety barrier preventing operator arms and hands from entering during cutting operations. The safety barrier is muted when a container 90 emerges ready for unloading by the operator and no cutting actions are in progress.

In some operations, containers 90 conveyed into the apparatus 10, 110 may have dents or indentations in the sides of the containers 90. Because the depth of the cuts 93 produced with the apparatus 10, 110 is programmable and controllable, operation of the apparatus 10, 110 does not necessarily depend on the sides of the container 90 being "perfectly" located. The penetration of the cuts 93 into the sidewalls of the containers 90 is limited by the "hilt" or side of the cutter head 50. The container 90 wall is contacted by the cutter head 50 as the cut 93 begins conforming to the container 90 surface. If the container 90 surface is sharply indented, the blade 55 may skip cutting that indented area.

As described and discussed herein, the controller 60 may control the operation of the apparatus 10, 110 by controlling the main operations and functions therein. The controller 60 can be a simple computer, a low cost programmable logic controller, or a less integrated system known in the art for controlling operation of the apparatus 10, 110. In the present embodiment, the controller 60 may preferably be a conveyor controller, such as the ConveyLogix, which is available from Insight Automation.

The controller 60 may thus operate the right angle transfer conveyors 21, 22 and 23, 24 to move the container 90 into a first and second cutting area 13, 14 relative to the cutting head 50 horizontal cutting axis. The vertical axis does no cutting but lowers the cutting head 50 to make contact with the top of the container 90 of unknown height. Each of the cutting axes completes its motion signaling to the controller 60 to indicate the cut 93 is complete with reading a spike in current or a simple limit switch, in one embodiment, indicating the cut travel is complete. Each of the cutting axes moves past its respective side of the container 90 allowing the vertical axis to lift unclamping the container 90. The controller 60 energizes the right angle transfer conveyors 21, 22 and 23, 24 so that the container 90 can get to its respective first or second cutting areas 13, 14. These and other features are apparent by the above disclosure and attached drawings.

Figure 17:
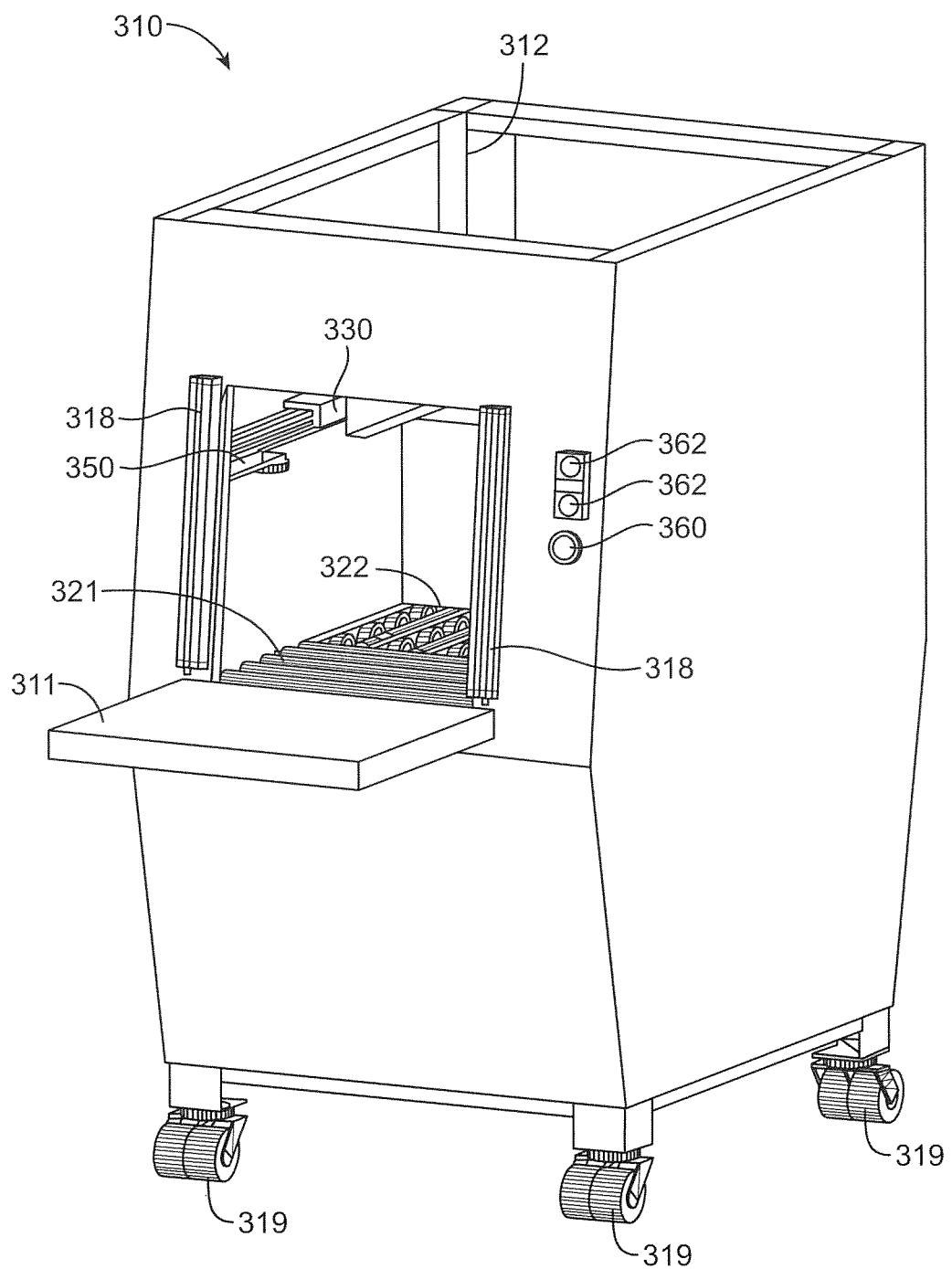
FIG. 17 a perspective view of an embodiment of an automated container cutting apparatus in accordance with certain teachings of the present invention.
Figure 18:
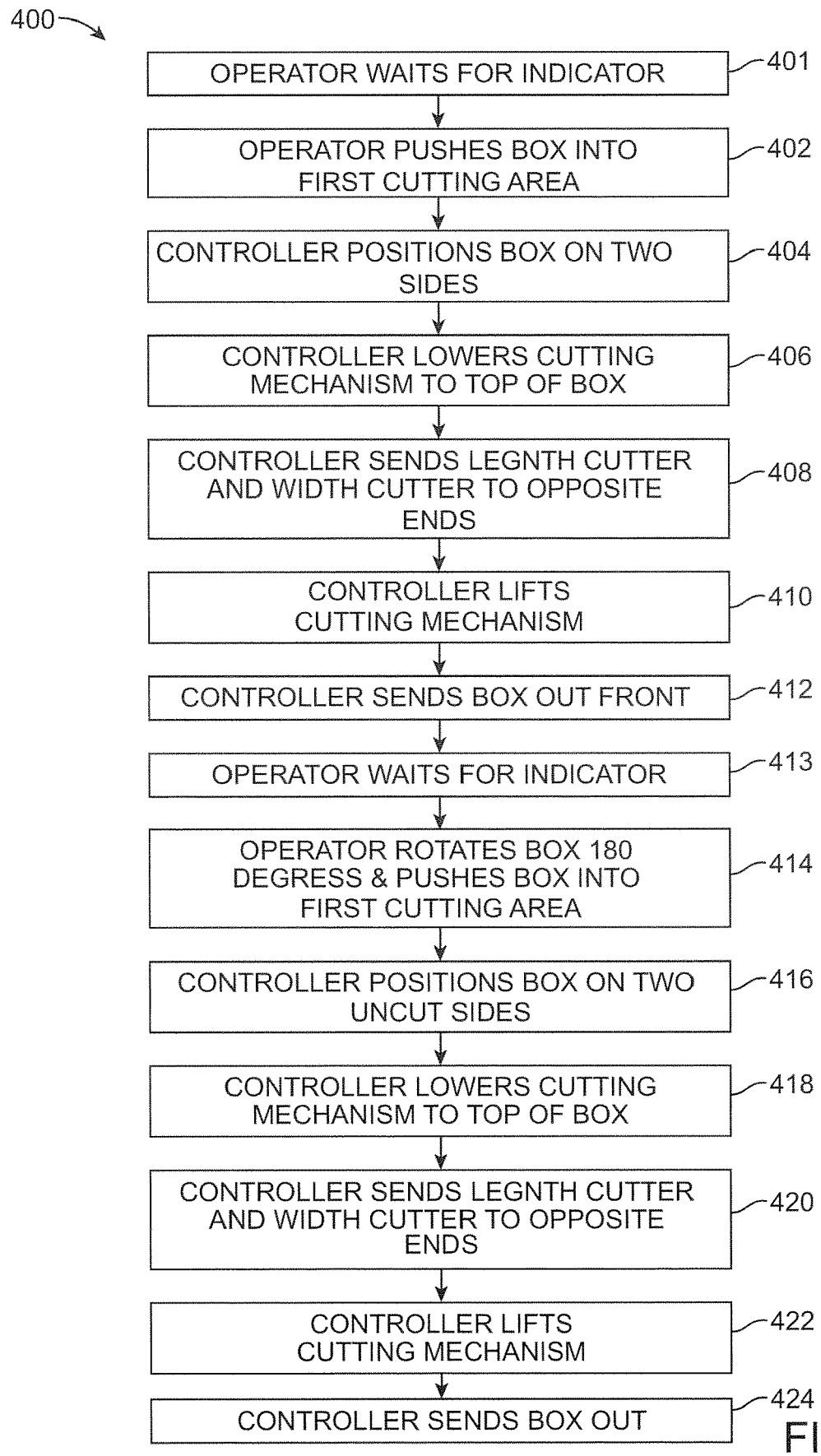
FIG. 18 is a flow chart illustrating an embodiment of a process for operating an automated container cutting apparatus in accordance with certain teachings of the present invention.

Another embodiment of the present invention is illustrated in FIGS. 17-18. The automated container cutting apparatus 310 is essentially one half of the above apparatus 10, 110 with a single cutting area. Accordingly, like numerals have been used to identify like functions/features in this embodiment. The loading and cutting operations are very similar to the functions as described above for apparatus 10, 110 in many ways.

The apparatus 310 may be provided with a shelf 311, a frame 312 supported by casters 319, ingress/egress sensors 318, a set of rollers 321, a right angle conveyor 322, a cutting mechanism 330 with a cutting head 350 as well as a controller 360 with indicators 362. Provided the indicator 362 is acceptable to the user/operator (Step 401), a container or box 90 may be inserted into the first cutting area of the apparatus 310 (Step 402). The controller 360 may then position the box on two sides using the right angle transfer 321, 322 (Step 404) before lowering the cutting mechanism 330 to the top of the box (Step 406). The controller 360 may then send the cutting head 350 along the length of one side of the box to cut it and another cutting head 350, mounted on another axis of the cutting mechanism 330, along the width of the box to cut another side (Step 408). After the container (not shown) is cut by the cutting heads 350, the controller may lift the cutting mechanism 330 off of the box (Step 410) and eject it back through the front portal in the frame 312 where the operator pulls the container clear of the portal. Again, provided the one or more indicators 362 are acceptable to the user/operator (Step 413), the operator rotates the container 180 degrees then pushes the box back into the apparatus 310 where it is loaded back into the cutting area (Step 414). Again, the apparatus 310 uses its right angle transfer conveyor 321, 322 to position the box on two uncut sides (Step 416), lowers the cutting mechanism 330 onto the top of the box (Step 418) and cuts on the other uncut sides (Step 420). The container 90 is then released by the controller 360 when the cutting mechanism 330 is lifted (Step 422) and the box is ejected by the right angle transfer conveyor 321, 322 (Step 424) producing a completely openable container.

As described above, with a single two axis cut zone, two sides of the container (not shown) may be cut. To cut all four sides, the container 90 must be rotated 180 degrees after the first cut and reinserted into the apparatus 310. The benefits of this design are improved mobility because of small size and lowest possible cost. This apparatus 310 uses one cut module and relies on the user/operator to rotate the container 90 after the first two sides are cut sending the container back to complete the cut around the top of the container.

As will be understood by those skilled in the art, and in various embodiments, other means and methods for conveying containers may be employed, etc. For example, two out zones may be arranged in-line for the purpose of an in-line or pass through container flow. This configuration may allow the container opening device to be placed in a standard conveyor system for automatic operation without need of an operator to feed and remove containers. In another example, arrangements can be provided that allow the top side of the container to be cut by rotating the cutting element 90 degrees. It is also possible to angle the cuts upwards when cutting from the side to provide some additional protection to the contents of the container when cutting. Further, an alternative embodiment may be to use a conveyor for forward and backward motions coupled with a pusher device(s) or bar coupled with a linear actuator with motion at right angles to the conveyor. An optional fold up roller table at the machine entrance facilities staging and positioning of containers 90 for loading and unloading. Right angle transfer conveyance systems are available in many forms and one of many different designs can be effectively used in the embodiments of the present invention.

The foregoing describes an automated cutting apparatus that addresses the need to provide versatile and portable automated container opening without the costs or risks of implementation.

Although the invention has been described in detail for the purpose of illustration based on what is currently considered to be the most practical and preferred embodiment(s), it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. Since other modifications and changes varied to fit particular operating requirements and environments will be apparent to those skilled in the art, the invention is not considered limited to the example chosen for purposes of disclosure, and covers all changes and modifications which do not constitute departures from the spirit and scope of this invention.

What is claimed is:

1. An automated container cutting apparatus, comprising:
a frame:
cutting mechanisms positioned within the frame, each of the cutting mechanisms comprising:
a vertical rail;
a corner brace slidably connected to the vertical rail for movement therealong;
a first support arm and a second support arm connected to the corner brace;
a first cutting element connected to the first support arm to cut in a first horizontal direction; and
a second cutting element connected to the second support arm to cut in a second horizontal direction; and
a conveyor mechanism positioned within the frame, comprising:
a first linear conveyor to direct a container in a first direction relative to the cutting mechanisms; and a first right angle conveyor at a right angle to the first linear conveyor to direct the container in a second direction between the cutting mechanisms;

wherein the cutting mechanisms are supported about the conveyor mechanism to cut the container on two adjacent edges while the container is adjacent one of the cutting mechanisms.

2. The apparatus of claim 1, wherein the first right angle conveyor positions the container in a first cutting position and wherein the apparatus further comprises: a second conveyor mechanism comprising a second linear conveyor and a second right angle conveyor to position the container in a second cutting position.

3. The apparatus of claim 2, further comprising: a second drive mounted to the second support arm and operatively connected to the second cutting element for selectively translating the second cutting element.

4. The apparatus of claim 1, further comprising: a first drive mounted to the first support arm and operatively connected to the first cutting element for selectively translating the first cutting element.

5. The apparatus of claim 1, wherein each of the cutting mechanisms further comprise:

a vertical drive operatively connected to the first and second cutting elements to selectively translate the first cutting element and the second cutting element together.

6. The apparatus of claim 1, wherein the vertical rail is positioned orthogonally to the first horizontal direction.

7. The apparatus of claim 6, wherein the vertical rail supports the corner brace, the first support arm, and the second support arm.

8. The apparatus of claim 1, further comprising: casters operatively connected to the frame.

9. The apparatus of claim 1, further comprising: one or more doors operatively connected to the frame.

10. An automated container cutting apparatus, comprising:

a frame;

a conveyor mechanism positioned within the frame, the conveyor mechanism comprising a first conveyor and a second conveyor, the second conveyor at a right angle to the first conveyor; and cutting mechanisms positioned within the frame, each of the cutting mechanisms positioned at a different location about the frame, each of the cutting mechanisms comprising:

a vertical rail connected to the conveyor mechanism;

a corner brace slidably connected to the vertical rail for movement therealong;

first and second supports connected to the corner brace, the first support extending in a first direction from the corner brace, the second support extending in a second direction from the corner brace, the second direction at an angle to the first direction;

a first cutting element connected to the first support to cut in the first direction;

a second cutting element connected to the second support to cut in the second direction;

a first drive mounted to the first support and operatively connected to the first cutting element to selectively translate the first cutting element; and a second drive mounted to the second support and operatively connected to the second cutting element to selectively translate the second cutting element;

whereby the first and second cutting elements of a first of the cutting mechanisms are positionable to cut a first set of adjacent edges of a container when in a first cutting location and wherein the first and second cutting elements of a second of the cutting mechanisms are positionable to cut a second set of adjacent edges of the container when in a second cutting location.

11. The automated container cutting apparatus of claim 10, further comprising a respective housing positioned about each of the first and second cutting elements.

12. The automated container cutting apparatus of claim 10, further comprising:

a first cutting mechanism comprising the first cutting element, the first drive, the second cutting element, and the second drive;

a second cutting mechanism comprising another first cutting element, another first drive, another second cutting element, and another second drive;

wherein, when the container is positioned adjacent the first cutting element and the second cutting element of the first cutting mechanism, the first cutting element and the second cutting element are positioned to cut the first set of adjacent edges of the container; and wherein, when the container is positioned adjacent the another first cutting element and the another second cutting element of the second cutting mechanism, the another first cutting element and the another second cutting element are positioned to cut the second set of adjacent edges of the container.

* * * * *